US008848064B2

(12) United States Patent
Topliss et al.

(10) Patent No.: US 8,848,064 B2
(45) Date of Patent: Sep. 30, 2014

(54) OPTICAL IMAGE STABILIZATION COMPRISING SHAPE MEMORY ALLOY ACTUATORS

(75) Inventors: Richard Topliss, Trumpington (GB); Robert John Leedham, Cambridge (GB)

(73) Assignee: Cambridge Mechatronics Limited, Cambridge (GB)

( * ) Notice: Subject to any disclaimer, the term of this patent is extended or adjusted under 35 U.S.C. 154(b) by 265 days.

(21) Appl. No.: 13/063,661

(22) PCT Filed: Sep. 11, 2009

(86) PCT No.: PCT/GB2009/002195
§ 371 (c)(1),
(2), (4) Date: May 18, 2011

(87) PCT Pub. No.: WO2010/029316
PCT Pub. Date: Mar. 18, 2010

(65) Prior Publication Data
US 2011/0249131 A1 Oct. 13, 2011

(30) Foreign Application Priority Data

Sep. 12, 2008 (GB) .................................. 0816674.6
Oct. 17, 2008 (GB) .................................. 0818981.3
Feb. 11, 2009 (GB) .................................. 0902213.8
Feb. 12, 2009 (GB) .................................. 0902249.2
Apr. 29, 2009 (GB) .................................. 0907414.7

(51) Int. Cl.
*H04N 5/228* (2006.01)
*H04N 5/232* (2006.01)
*G02B 27/64* (2006.01)
*G03B 5/00* (2006.01)

(52) U.S. Cl.
CPC .......... *G03B 5/00* (2013.01); *G03B 2205/0007* (2013.01); *H04N 5/23248* (2013.01); *G02B 27/646* (2013.01); *G03B 2205/0076* (2013.01)
USPC ........................................ 348/208.7; 348/374

(58) Field of Classification Search
USPC ................... 348/208.4–208.7, 374
See application file for complete search history.

(56) References Cited

U.S. PATENT DOCUMENTS 4,930,494 A 6/1990 Takehana et al.
4,932,210 A 6/1990 Julien et al.
(Continued)

FOREIGN PATENT DOCUMENTS

EP 1 304 872 A1 4/2003
EP 1 640 757 A1 3/2006
(Continued)

OTHER PUBLICATIONS

Japanese Office Action dated Sep. 5, 2013 regarding Patent Application No. 2011-526556. Translation provided by J A Kemp.

*Primary Examiner* — Gevell Selby
(74) *Attorney, Agent, or Firm* — Harness, Dickey & Pierce, P.L.C.

(57) ABSTRACT

A camera apparatus capable of providing optical image stabilization comprises: a support structure; a camera unit comprising an image sensor and a lens system; a suspension system comprising a plurality of flexure elements supporting the camera unit on the support structure in a manner allowing the camera unit to tilt; and a plurality of SMA actuators each formed as SMA wire connected between the camera unit and the support structure and arranged on contraction to drive tilting of the camera unit. The SMA wire may be fixed to the camera unit at its ends and hooked over an element of the support structure. A vibration sensor, whose output is used as the basis for generating drive signals, may be mounted on the camera unit.

14 Claims, 10 Drawing Sheets

(56) References Cited

U.S. PATENT DOCUMENTS

| | | |
|---|---|---|
| 4,977,886 A | 12/1990 | Takehana et al. |
| 5,459,544 A | 10/1995 | Emura |
| 5,763,979 A | 6/1998 | Mukherjee et al. |
| 5,963,248 A * | 10/1999 | Ohkawa et al. .......... 348/207.99 |
| 6,449,434 B1 | 9/2002 | Fuss |
| 6,459,855 B1 | 10/2002 | Kosaka et al. |
| 6,516,146 B1 | 2/2003 | Kosaka |
| 6,554,501 B2 | 4/2003 | Kosaka et al. |
| 6,574,958 B1 | 6/2003 | MacGregor |
| 6,945,045 B2 | 9/2005 | Hara et al. |
| 2001/0002226 A1 | 5/2001 | Tanaka et al. |
| 2001/0025477 A1 | 10/2001 | Hara et al. |
| 2002/0001467 A1 | 1/2002 | Tanaka et al. |
| 2002/0113499 A1 | 8/2002 | von Behrens et al. |
| 2003/0076421 A1* | 4/2003 | Dutta ...................... 348/208.11 |
| 2003/0079472 A1 | 5/2003 | Hara et al. |
| 2005/0030408 A1 | 2/2005 | Ito et al. |
| 2006/0048511 A1 | 3/2006 | Everson et al. |
| 2006/0150627 A1* | 7/2006 | Oohara ........................... 60/528 |
| 2006/0209195 A1 | 9/2006 | Goto |
| 2006/0266031 A1 | 11/2006 | Kosaka et al. |
| 2006/0272328 A1 | 12/2006 | Hara et al. |
| 2007/0109412 A1* | 5/2007 | Hara ......................... 348/207.1 |
| 2007/0279497 A1* | 12/2007 | Wada et al. ................. 348/208.7 |
| 2008/0085108 A1 | 4/2008 | Sekino et al. |
| 2008/0198249 A1* | 8/2008 | Tanimura et al. .............. 348/294 |
| 2008/0247748 A1 | 10/2008 | Tanimura et al. |
| 2008/0278030 A1 | 11/2008 | Hara et al. |
| 2008/0278590 A1 | 11/2008 | Tanimura et al. |
| 2008/0282696 A1 | 11/2008 | Wada et al. |
| 2009/0009656 A1 | 1/2009 | Honda et al. |
| 2009/0052037 A1* | 2/2009 | Wernersson .................. 359/554 |
| 2009/0295986 A1 | 12/2009 | Topliss et al. |
| 2010/0060776 A1 | 3/2010 | Topliss et al. |
| 2010/0074608 A1 | 3/2010 | Topliss |
| 2010/0098394 A1 | 4/2010 | Ishihara et al. |
| 2010/0257859 A1 | 10/2010 | Honda |
| 2010/0275592 A1 | 11/2010 | Topliss et al. |
| 2010/0320943 A1 | 12/2010 | Honda |
| 2011/0031924 A1 | 2/2011 | Honda |
| 2011/0032628 A1 | 2/2011 | Tanimura et al. |
| 2011/0242398 A1 | 10/2011 | Honda et al. |
| 2011/0249131 A1 | 10/2011 | Topliss et al. |
| 2012/0019675 A1 | 1/2012 | Brown |
| 2012/0038703 A1 | 2/2012 | Taya et al. |
| 2012/0123737 A1 | 5/2012 | Hansen |
| 2013/0002933 A1 | 1/2013 | Topliss et al. |

FOREIGN PATENT DOCUMENTS

| | | |
|---|---|---|
| EP | 1 914 422 A1 | 4/2008 |
| EP | 2 003 489 A2 | 12/2008 |
| EP | 2239610 A1 | 10/2010 |
| EP | 2397826 A1 | 12/2011 |
| GB | 2280957 A | 2/1995 |
| GB | 2434214 A | 7/2007 |
| JP | 2002 130114 | 5/2002 |
| JP | 2005278133 A | 10/2005 |
| JP | 2006023556 A | 1/2006 |
| JP | 2006154345 A | 6/2006 |
| JP | 2006178303 A | 7/2006 |
| JP | 2007315352 A | 12/2007 |
| JP | 2009086142 A | 4/2009 |
| JP | 2010185930 A | 8/2010 |
| KR | 2009 0081855 A | 7/2009 |
| WO | 03/012384 A2 | 2/2003 |
| WO | WO-03048831 A2 | 6/2003 |
| WO | 2005/026539 A2 | 3/2005 |
| WO | 2005075823 A1 | 8/2005 |
| WO | 2006054535 A1 | 5/2006 |
| WO | WO-2006059098 A1 | 6/2006 |
| WO | 2006105588 A1 | 10/2006 |
| WO | 2007018086 A1 | 2/2007 |
| WO | WO-2007-113478 A1 | 10/2007 |
| WO | 2008-099155 A1 | 8/2008 |
| WO | WO-2008-099156 A2 | 8/2008 |
| WO | 2008129290 A1 | 10/2008 |
| WO | WO-2008-129291 A2 | 10/2008 |
| WO | WO-2009/027775 A1 | 3/2009 |
| WO | WO-2009056822 A2 | 5/2009 |
| WO | 2009-071898 A2 | 6/2009 |
| WO | 2009090958 A1 | 7/2009 |
| WO | 2010/058177 A2 | 5/2010 |
| WO | 2010049689 A2 | 5/2010 |
| WO | 2010/073902 A1 | 7/2010 |
| WO | 2010/089526 A2 | 8/2010 |
| WO | WO-2010089529 A1 | 8/2010 |
| WO | 2011/104518 A1 | 9/2011 |
| WO | 2012020212 A1 | 2/2012 |
| WO | 2012038703 A2 | 3/2012 |

* cited by examiner

OPTICAL IMAGE STABILIZATION COMPRISING SHAPE MEMORY ALLOY ACTUATORS

CROSS-REFERENCE TO RELATED APPLICATIONS

This application is a 371 U.S. National Stage of International Application No. PCT/GB2009/002195, filed Sep. 11, 2009. This application claims the benefit of United Kingdom Patent Applications No. GB 0816674.6, filed Sep. 12, 2008; No. GB 0818981.3, filed Oct. 17, 2008; No. GB 0902213.8, filed Feb. 11, 2009; No. GB 0902249.2, filed Feb. 12, 2009 and No. GB 0907414.7, filed Apr. 29, 2009. The disclosures of the above applications are incorporated herein by reference.

The present invention relates to optical image stabilisation (OIS) of camera apparatus comprising an image sensor and a lens system for focussing an image on the image sensor.

The purpose of OIS is to compensate for camera shake, that is vibration of the camera apparatus typically caused by user hand movement, that degrades the quality of the image captured by the image sensor. OIS typically involves detection of the vibration by a vibration sensor such as a gyroscope sensor, and control on the basis of the detected vibration of an actuator arrangement that adjusts the camera apparatus to compensate the captured image for the vibration.

Several techniques for adjusting the camera apparatus are known. One technique typically employed in digital stills cameras is to keep the position of the camera apparatus as a whole fixed (including the image sensor and most of the lens system) and to move one lens group in directions perpendicular to the optical axis. This technique is particularly suitable to large cameras as the lens group is of low size and inertia as compared to the remainder of the camera. An alternative technique is to keep the lens system still, and to move the image sensor in directions perpendicular to the optical axis.

Although these techniques are successful in relatively large camera apparatuses such as digital still cameras, they are difficult to miniaturise. The very tight packaging of components in miniature camera apparatuses presents great difficulties in adding OIS actuators within the desired package.

US-2006/0272328 discloses a camera apparatus in which a different technique is used to provide OIS. In particular, the camera unit including the image sensor and the lens system is supported on a support structure by an elastic support member that allows tilting the camera unit around two notional axes that are perpendicular to each other and to the optical axis. Two pairs of SMA wire are connected between the support structure and the camera unit, extending at an acute angle to the optical axis. The SMA wires of each pair are aligned opposite another in a push-pull configuration so that differential contraction drives tilting of the camera unit. The drive currents applied to the SMA wires are derived based on the output of a vibration sensor attached to the support structure to compensate for camera shake. US-2006/0272328 teaches that a sufficiently high frequency response can be achieved by reducing the diameter of the SMA wire. Typically a perceived drawback of SMA as an actuator is its slow response time. As the SMA actuator is thermally driven, the response time is limited by the temperature rise and fall of the SMA material, which is associated with its thermal conductivity, specific heat capacity, and its thermal mass.

Therefore, OIS is achieved by tilting the camera unit in directions perpendicular to the optical axis. This is made possible because the size and inertia of the camera unit is small, and is beneficial so as to separate the OIS function from the other camera functions. In particular, it is unnecessary to alter the complex internal design of the camera unit, such as the highly tolerated optical components. Furthermore, by using SMA as an actuator, there are achieved the advantage of a very high energy density (mechanical energy available for a given mass of material). In other words, this allows the actuator arrangement to be extremely small. Similarly, SMA actuators are able to deliver high forces. Both these factors mean that SMA actuators are highly suited to providing OIS for a miniature camera.

However, the camera apparatus disclosed in US-2006/0272328 suffers from disadvantages related to positional control and to lifetime and fatigue arising because of the fact that each pair of SMA wires is arranged in a push-pull configuration. In particular, the two SMA wires fight each other in the sense that they are pulling in opposite directions perpendicular to the optical axis. That is to say, the stress in each SMA wire and therefore length of the SMA wire is dependent on the other SMA wire.

Firstly, this causes a problem with achieving accurate positional control. A desired angle of the camera apparatus corresponds to a particular wire length, but at this length each SMA wire may have a variety of stresses, depending on the stress in the other SMA wire. Therefore the positions of each SMA wire cannot be independently controlled. Although positional control can still in principle be achieved, in practice it is difficult to do this accurately. For example if attempting to provide control based on the resistance of the SMA wires, the phase transition temperature has a dependency on the stress, and also the SMA wire resistivity changes with temperature. Therefore a given wire length does not correspond to a given resistance when operating against the other wire.

Secondly, as the SMA wires of the pair act against each other, they are typically subject to relatively high stresses, for example if both SMA wires are driven or if the ambient temperature is high enough to reach the phase transition temperature range. Such high stresses in the SMA wires can cause fatigue resulting in a reduction in their lifetime.

It would be desirable to reduce these problems.

According to a first aspect of the present invention, there is provided a camera apparatus comprising:

a support structure;

a camera unit comprising an image sensor and a lens system for focussing an image on the image sensor;

a suspension system supporting the camera unit on the support structure in a manner allowing the camera unit both to tilt around two notional axes that are perpendicular to each other and to the optical axis of the lens system with freedom and to move along the optical axis; and at least three SMA actuators each connected between the camera unit and the support structure and arranged, on contraction, to drive displacement of the camera unit along the optical axis relative to the support structure, the SMA actuators being arranged at different positions around the optical axis so that the SMA actuators, on contraction to drive differential displacement, drive tilting of the camera unit.

Thus, the camera unit is capable of tilting in directions perpendicular to the optical axis, actuated by the SMA actuators. This allows an OIS function to be achieved with similar advantages to those set out above for US-2006/0272328 that it is unnecessary to alter the complex internal design of the camera unit and that the apparatus is compact due to the high energy density of SMA.

However, in contrast to US-2006/0272328, the camera unit is provided with a suspension system that allows the camera unit to move along the optical axis and similarly the SMA actuators are arranged to drive displacement of the camera unit along the optical axis. Thus tilting is achieved by the SMA actuators driving differential displacement, but the SMA actuators are not in opposition against each other. As compared to US-2006/0272328, this provides improvements relating to positional control and to fatigue and lifetime. In particular, the displacement of each SMA actuator to achieve a desired displacement of the SMA actuator concerned can be controlled independently. Although the displacements are chosen together because differential displacement yields a resultant tilt of the camera unit, each SMA actuator can be controlled by itself, for example based on the resistance of that SMA actuator. This may be viewed as decoupling of the SMA actuators by the changing the form of the suspension system to allow movement along the optical axis, rather than providing tilting about a fixed fulcrum.

Similarly, as the SMA actuators each drive movement along the optical axis, they do not oppose each other. This avoids the relatively high stresses, and reduces the associated problem of fatigue resulting in a reduction of lifetime, to which SMA actuators in opposition are susceptible.

The second aspect of the present invention is concerned with improving the design of a camera apparatus in which OIS is provided by a technique in which the camera unit comprising an image sensor and a lens system is tilted around two notional axes that are perpendicular to each other and to the optical axis of the lens system.

According to a second aspect of the present invention, there is provided a camera apparatus comprising:

a support structure;

a camera unit comprising an image sensor and a lens system for focussing an image on the image sensor;

a suspension system comprising a plurality of flexure elements supporting the camera unit on the support structure in a manner allowing the camera unit to tilt around two notional axes that are perpendicular to each other and to the optical axis of the lens system on deflection of the flexure elements; and a plurality of SMA actuators each connected between the camera unit and the support structure and arranged on contraction to drive tilting of the camera unit.

Thus, the camera unit is capable of tilting in directions perpendicular to the optical axis, actuated by the SMA actuators. This allows an OIS function to be achieved with similar advantages to those set out above for US-2006/0272328 that it is unnecessary to alter the complex internal design of the camera unit and that the apparatus is compact due to the high energy density of SMA.

However, in contrast to US-2006/0272328, the camera unit is provided with a suspension system formed by a plurality of flexure elements. Flexure elements provide numerous benefits as a suspension system. The flexure elements may be arranged to provide a low stiffness along the movement axis and a high stiffness perpendicular to the movement axis. Similarly, flexures experience a minimal degree of friction against movement, as compared for example to a bearing. Lastly, a suspension system formed by flexures is compact and straightforward to manufacture.

In addition, the use of flexure elements provides a suspension system which allows the camera unit to move along the optical axis, thereby providing the same advantages as the first aspect of the present invention, as set out above.

A first optional feature of the second aspect is concerned with minimising the size of a camera apparatus in which OIS is provided by a technique in which the camera unit comprising an image sensor and a lens system is tilted around two notional axes that are perpendicular to each other and to the optical axis of the lens system. This is particularly desirable for a miniature camera, for example intended for use in a portable electronic device.

The first optional feature of the second aspect is that the SMA actuators each comprise a piece of SMA wire fixed at both ends to one of the camera unit and the support structure and intermediate its ends hooked over a portion of a respective flexure element that is connected to the other one of the camera unit and the support structure, the SMA actuators being arranged on contraction to drive tilting of the camera unit, the resultant deflection of the flexure elements providing a biasing force reacting against the SMA actuator.

In contrast to US-2006/0272328, the camera unit is provided with a suspension system formed by a plurality of flexure elements with the SMA actuators formed as a piece of SMA wire hooked over a portion of a respective flexure element. This arrangement minimises the size of a camera apparatus. It is very compact, principally because of the intimate arrangement of the flexure elements and SMA wire. As the SMA wire is hooked over the flexure element, the SMA wire is connected to the other one of the camera unit and the support structure without it being essential to fix the SMA wire thereto.

Advantageously, the flexure elements may each comprise a pair of flexure beams extending from an intermediate portion that is connected to said other one of the camera unit and the support structure to portions that are connected to said one of the camera unit and the support structure. The intermediate portion may protrude away from the flexure beams along the optical axis. In this case the pieces of SMA wire may be hooked over the intermediate portion which provides a convenient and compact arrangement.

Advantageously, the pieces of SMA wire may extend between the camera unit and the support structure perpendicular to a notional line radial of the optical axis. This further minimises the size of the arrangement as the overall extent of the SMA, wire in the radial direction is minimised.

In this case, the pieces of SMA wire may also extend at a non-zero angle to the optical axis. This magnifies the degree of displacement achievable by a given length of SMA wire as this geometry causes the orientation of the SMA wire to change on contraction. Effectively, that decreases the size of the camera apparatus as compared to the SMA wire being parallel to the optical axis as the length necessary to achieve a required displacement is reduced.

A second optional feature of the second aspect is concerned with improving the performance of a camera apparatus in which OIS is provided by a technique in which the camera unit comprising an image sensor and a lens system is tilted around two notional axes that are perpendicular to each other and to the optical axis of the lens system. There are various variables and constraints, including the arrangement and properties of the SMA material, and the arrangement and properties of the flexures of the suspension system.

The second optional feature of the second aspect is that the camera apparatus further comprises a biasing element, separate from the suspension system, that provides a biasing force reacting against the SMA actuator on contraction of the SMA actuator.

Where a suspension system comprises a plurality of flexure elements, it might be perceived that an advantage is that the flexure elements also act as a biasing means providing a bias force in an opposite direction from the force applied by the SMA actuator on contraction. However, instead of that, a separate biasing element is provided with the following advantages.

Desirably, the apparatus is configured to develop a relatively high stress in the SMA actuator. Such stress raises the temperature at which the stress in the SMA material is sufficient to cause contraction against the biassing means. This is desirable to increase the range of ambient temperatures at which the apparatus is usable. However, such stressing of the SMA actuator needs to be balanced against other design constraints, notably the range of movement achievable. The maximum movement achievable is constrained by the need to avoid a degree of deflection of the flexure elements which causes the material limits of the flexure elements to be exceeded. The stress can be increased by increasing the stiffness of the flexure elements. However, on deflection of the flexure elements, this also causes the material limits of the flexure elements to be approached more quickly and so can indirectly reduce the range of movement.

However, the provision of the biassing element, separate from the suspension system, provides the benefit of allowing a relatively high stress to be developed without impacting on these limitations on the suspension system. That is, the biassing element applies a relatively high force which increases the force to be developed in the SMA actuator to move the camera unit. However, as the biassing element does not suspend the camera unit on the support structure, the constraints on the design of the additional biassing element are greatly reduced. For example, the biassing element might be provided as a simple, coiled spring.

This reduces the design constraints on the apparatus as a whole, allowing an improved design. For example, as compared to an equivalent apparatus without the additional biassing element, the maximum degree of movement may be increased and/or the constraints on the design of the flexures may be relaxed.

The third aspect of the present invention is concerned with simplifying the implementation of a camera apparatus in which OIS is provided by a technique in which the camera unit comprising an image sensor and a lens system is tilted around two notional axes that are perpendicular to each other and to the optical axis of the lens system.

According to a third aspect of the present invention, there is provided a camera apparatus comprising:

a support structure;

a camera unit comprising an image sensor and a lens system for focussing an image on the image sensor;

a suspension system supporting the camera unit on the support structure in a manner allowing the camera unit to tilt around two notional axes that are perpendicular to each other and to the optical axis of the lens system;

a plurality of SMA actuators each comprising a piece of SMA wire arranged on contraction to drive tilting of the camera unit, each piece of SMA wire being fixed to the camera unit at its ends and hooked over an element of the support structure.

This provides the advantage of simplifying the overall camera apparatus incorporating an OIS function because the pieces of SMA wire are fixed to the camera unit, as opposed to the support structure. This facilitates the making of an electrical connection from a control circuit for supplying drive signals to the ends of the pieces of SMA wire that are fixed to the camera unit. For example, the pieces of SMA wire are typically fixed to the camera unit by crimping members that crimp the SMA wire, which may conveniently also provide an electrical connection. The advantage may be appreciated by considering that the camera unit includes an image sensor, itself having many electrical connections and typically requiring a printed circuit board. Thus electrical connections are made to both the pieces of SMA wire and to the image sensor at the camera unit which simplifies the electrical arrangement, because of the common electrical routing through the camera unit, which would require electrical connections in any event. For example the support structure may require no electrical connections at all.

Advantageously, there may also be mounted on the camera unit a vibration sensor arranged to generate output signals representative of the vibration of the camera unit, and in response to which the control circuit generates drive signals. This provides a similar advantage of simplifying the electrical arrangement in that the electrical connections to the vibration sensor is also provided on the camera unit. In addition, it provides a technical improvement to the quality of the optical image stabilisation. This is because the control algorithm implemented by the control circuit now seeks to minimise the vibrations detected by the vibration sensor rather than to delivering an opposing correction to the tilts sensed. In practice this provides more reliable compensation than if the vibration sensor is mounted on the support structure.

The fourth aspect of the present invention is concerned with improving the quality of the optical image stabilisation.

According to a fourth aspect of the present invention, there is provided a camera apparatus comprising:

a support structure;

a camera unit comprising an image sensor and a lens system for focussing an image on the image sensor;

a suspension system supporting the camera unit on the support structure in a manner allowing the camera unit to tilt around two notional axes that are perpendicular to each other and to the optical axis of the lens system;

an actuator arrangement arranged to drive tilting of the camera unit;

a vibration sensor mounted on the camera unit and arranged to generate output signals representative of the vibration of the camera unit; and a control circuit connected to the actuator arrangement for supplying drive signals thereto, the control circuit being arranged to generate the drive signals in response to the output signals of vibration sensor.

This provides a technical improvement to the quality of the optical image stabilisation. This is because the control algorithm implemented by the control circuit now seeks to minimise the vibrations detected by the vibration sensor rather than to delivering an opposing correction to the tilts sensed. In practice this provides more reliable compensation than if the vibration sensor is mounted on the support structure.

The various aspects of the invention may be used together in any combination.

To allow better understanding, an embodiment of the present invention will now be described by way of non-limitative example with reference to the accompanying drawings, in which.

OVERVIEW

Figure 1:
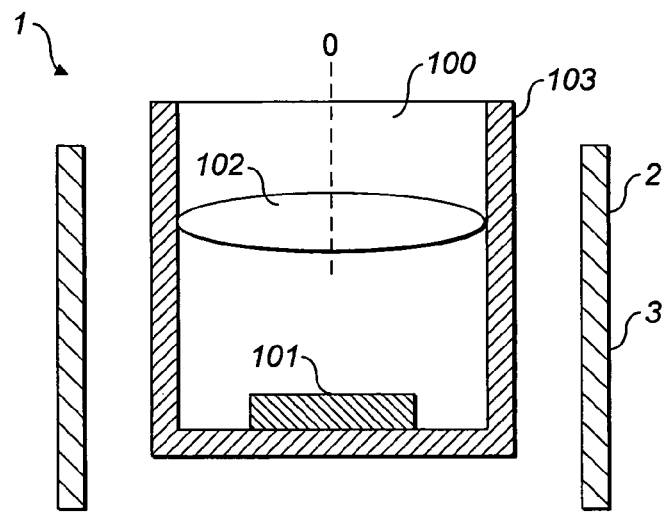
FIG. 1 is a schematic cross-sectional view of a camera apparatus.

A camera apparatus 1 arranged to perform OIS is shown schematically in FIG. 1 which is a cross-sectional view, the cross-section being taken along the optical axis O of the camera apparatus 1. The camera apparatus 1 is to be incorporated in a portable electronic device such as a mobile telephone, media player or portable digital assistant. Thus miniaturisation is an important design criterion.

The camera apparatus 1 comprises a support structure 2 and a camera unit 100 that is supported on the support structure 2 by a suspension system that is described in more detail below.

The camera unit 100 is a functional camera and comprises an image sensor 101 and a lens system 102, both supported on a camera support 103. The lens element 102 and the image sensor 101 are arranged along the optical axis O so that the lens system 102 focuses an image onto the image sensor 101. The image sensor 101 captures the image and may be of any suitable type for example a CCD (charge-coupled device) or a CMOS (complimentary metal-oxide-semiconductor) device. The camera unit 1 is a miniature camera having one or more lenses with a diameter of at most 10 mm.

As described further below, OIS is provided by tilting the entire camera unit 100 around axes that are perpendicular to the optical axis O, with the advantage that the internal construction of the camera unit 100 need not be adapted for this purpose. Thus, the camera unit 100 may be a functionally standard camera. Thus, the camera unit 100 may have any desired construction to provide the desired optical performance, irrespective of the OIS function. For example, the camera unit 100 may include a lens system 102 comprising a single lens or plural lenses as needed to provide the desired balance of optical performance and cost. Similarly the lens system 102 may provide a fixed focus or a variable focus. In the latter case, the camera unit 100 may employ any suitable construction for varying the focus, including the use of an SMA actuation arrangement. For example, the camera unit 100 may be a camera of the type described in WO-2007/113478, WO-2008/099156 or International application no. PCT/GB08/003657.

Some different arrangements of the camera apparatus and in particular the suspension system for suspending the camera unit 100 on the support structure 2 will now be described. In the different arrangements, common elements will be given common reference numerals and a description thereof will not be repeated.

First Arrangement

Figure 2:
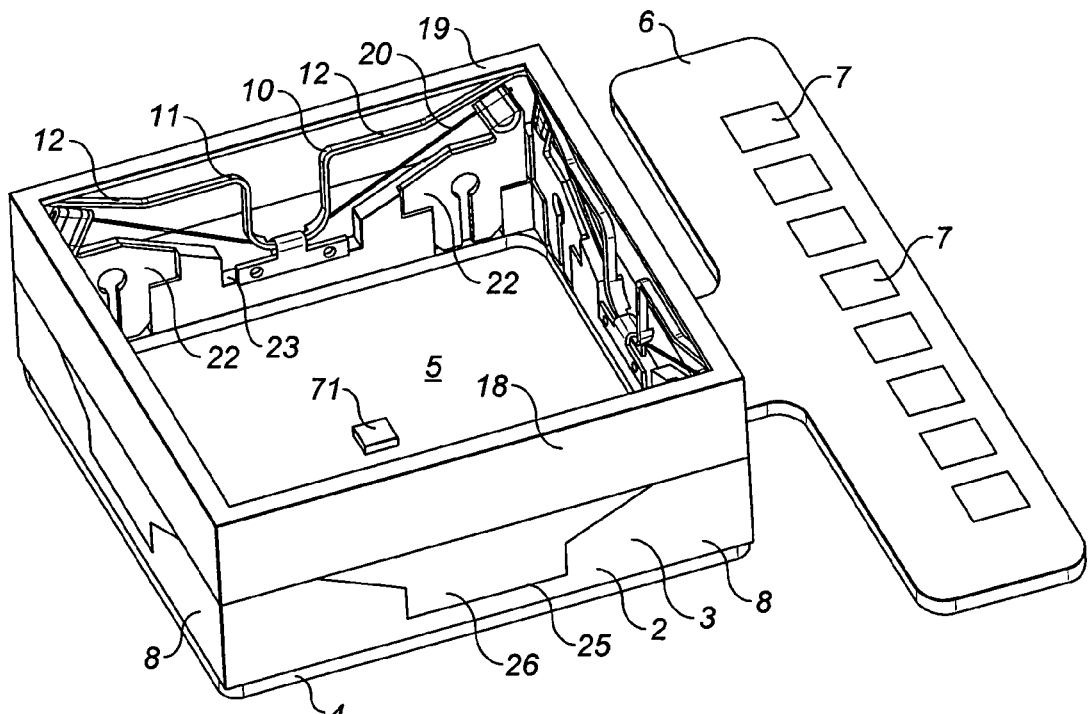
FIG. 2 is a perspective view of a first arrangement of the camera apparatus.

A first arrangement of the camera apparatus 1 is shown in FIG. 2 in which the camera unit 100 is omitted in order to illustrate the components of the suspension system, as follows. Although in general the mechanical architecture is not limited in size, this first arrangement provides OIS for a camera unit 100 having a standard 8.5 mm square footprint, typically for use in a mobile telephone.

Figure 3:
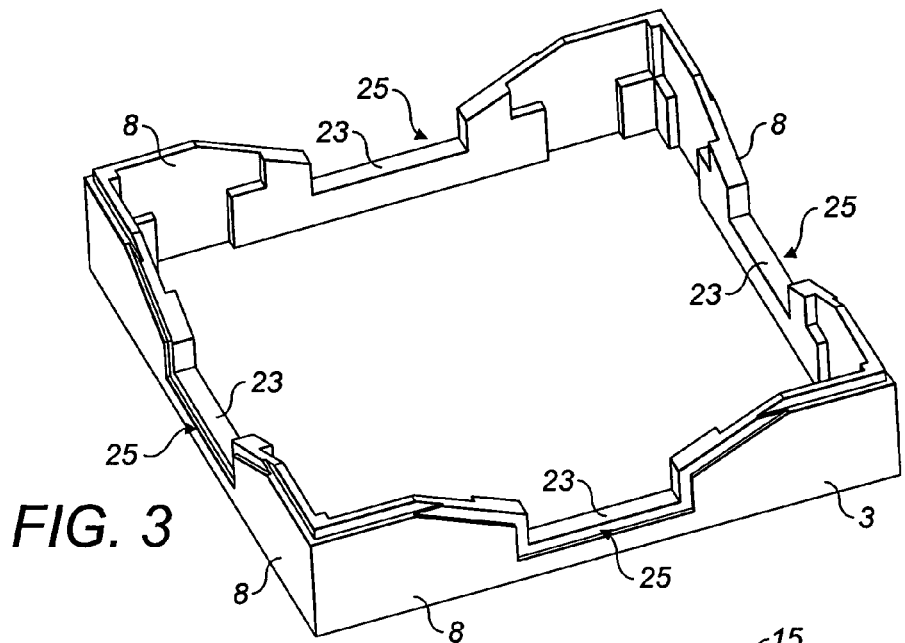
FIG. 3 is a perspective view of the chassis.

The support structure 2 comprises a chassis 3 and a base 4 that is a printed circuit board (PCB) with circuits for connection to the various electrical components of the camera apparatus 1. The base 4 has a square portion 5 and an extension 6 that protrudes laterally therefrom and has contacts 7 for connection to a control circuit. The chassis 3 is shown in isolation in FIG. 3 and takes the form of an annular wall having four side walls 8 of identical form, each extending along an edge of the square portion 5 of the base 4 and protruding therefrom. The chassis 3 may be formed as an injection moulded component and has the other components assembled thereon, as follows.

Figure 4:
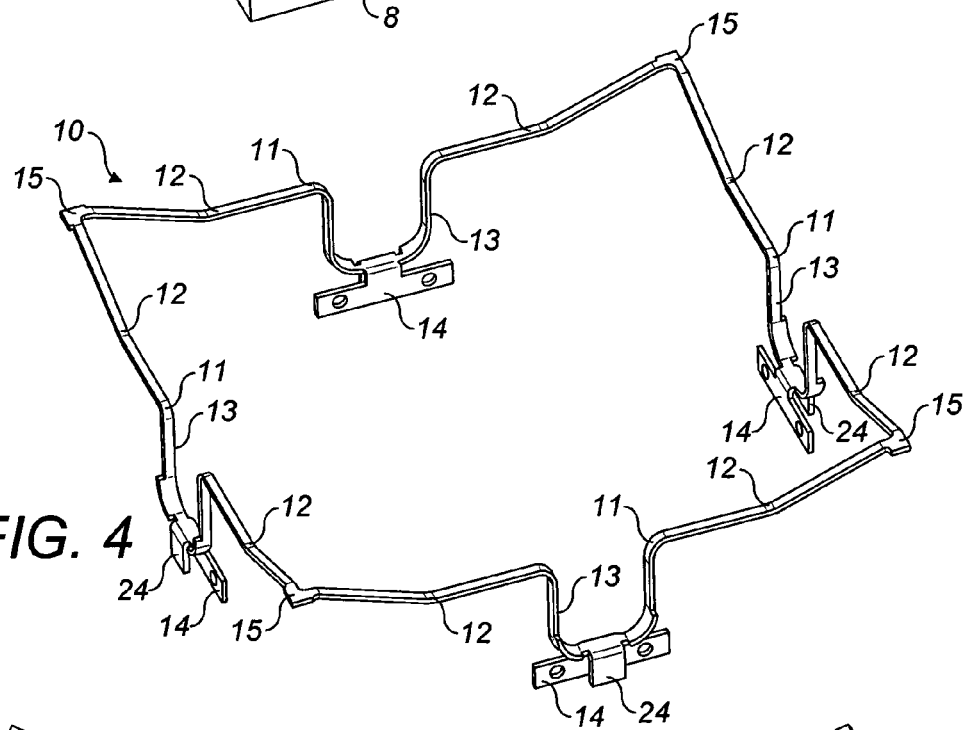
FIG. 4 is a perspective view of the suspension system.

The chassis 3 supports a suspension system 10 for the camera unit 100 which is illustrated in isolation in FIG. 4. The suspension system 10 comprises four flexure elements 11 each extending along one side wall 8 of the chassis 3. Each flexure element 11 comprises a pair of flexure beams 12 extending outwardly from an intermediate portion 13 having a mount 14 on the innermost side to which the camera unit 100 is connected. The flexure beams 12 extend from the intermediate portions 13 to corner portions 15 that are themselves connected to the corners of the chassis 3. The entire suspension system 10 consisting of all four flexure elements 11 is formed from a single piece of material, typically a metal, although in principle, each of the flexure elements 11 could equally be formed as a separate element given that the corner portions 15 are connected to the chassis 3.

The flexure beams 12 have a greater width as viewed along the optical axis O than thickness as viewed perpendicular to the optical axis O to allow deflection along the optical axis O while resisting movement perpendicular to the optical axis O. Thus, the flexure elements 11 support the camera unit 100 on the support structure 2, but allowing movement of the camera unit 100 along the optical axis O upon deflection of the flexure elements 11. As there is a flexure element 11 on each of the four sides of the camera unit 100, the suspension system 10 also allows tilting of the camera unit 100 around two notional axes that are perpendicular to each other and to the optical axis O, that is upon differential deflection of the flexure elements 11 arranged opposite one another. Such tilting around two perpendicular axes in general allows tilting of the camera unit 100 about any arbitrary axis perpendicular to the optical axis O.

The intermediate portions 13 have a U-shape as viewed perpendicular to the optical axis O, such that the intermediate portions 13 protrude away from the flexure beams 12 along the optical axis O. The mounting portion 14 is formed at the end of the intermediate portion 13 distal from the flexure beams 12.

The chassis 3 also has a can 18 seated thereon and protruding upwardly from each side wall 8 on the outside of the suspension system 10. The can 8 has a lip 19 extending inwardly towards the optical axis O to cover the suspension system 10. The can 18 protects the internal components of the camera apparatus 1. As an alternative to connecting the corner portions 15 of the suspension system 10 directly to the chassis 3, the corner portions 15 may be connected to the lip 19 of the can 18, for example by spot welding.

Figure 5:
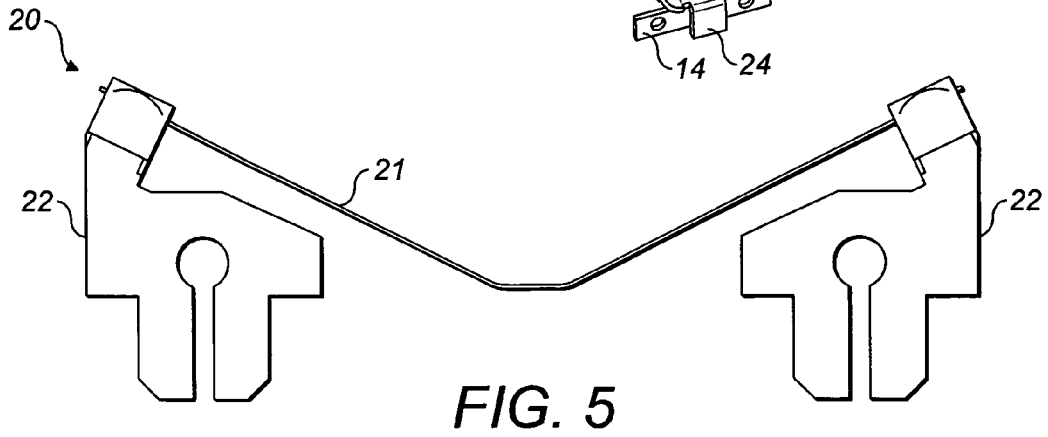
FIG. 5 is a side view of an SMA actuator.
Figure 6:
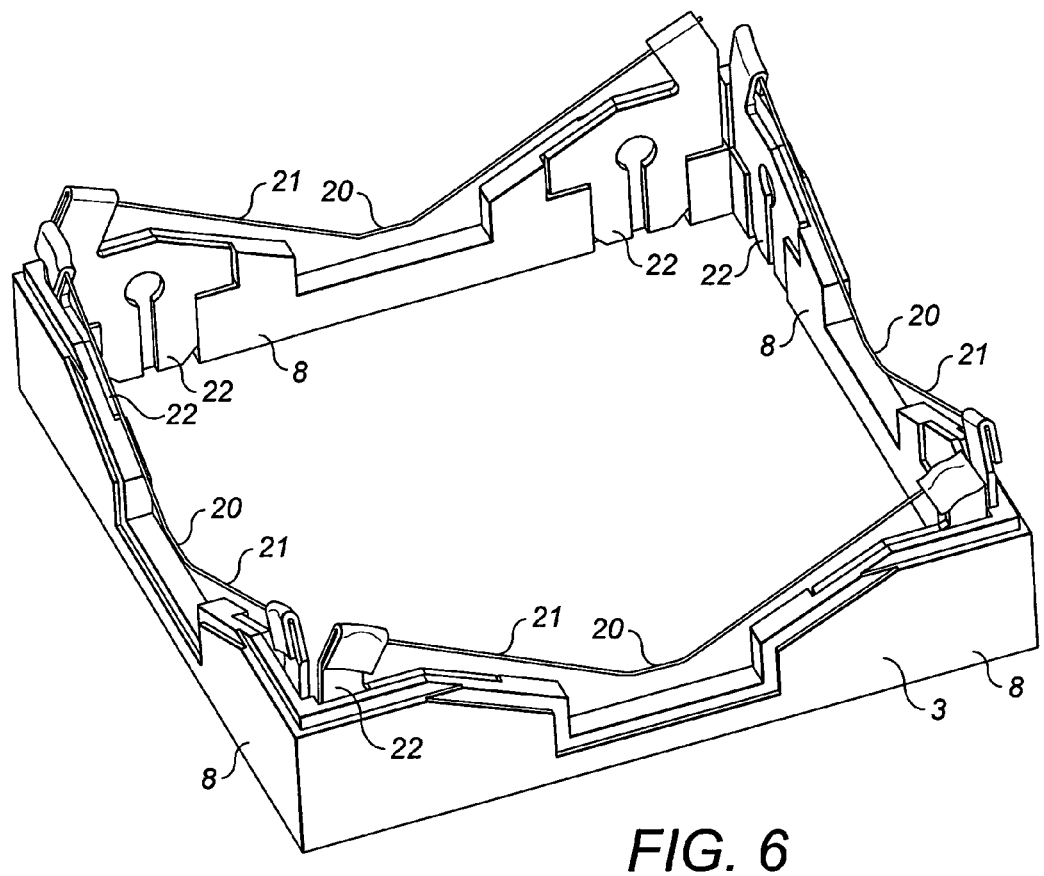
FIG. 6 is a perspective view of the chassis and SMA actuators.

The camera apparatus 1 further comprises four SMA actuators 20 arranged as follows. The SMA actuator 20 is illustrated in isolation in FIG. 5 and comprises a piece of SMA wire 21 mounted between two crimping members 22 that crimp the piece of SMA wire 21 at each end, thereby providing a mechanical terminal. The crimping members 22 are each fixed to the chassis 3 as shown in FIG. 6 to provide mechanical connection of the SMA actuator 20 to the chassis 3. This mounting may be achieved by a mechanical fitting, strengthened by the use of adhesive. The crimping members 22 of each SMA actuator 20 are located at opposite ends of a respective side wall 8 of the chassis 3 so that the piece of SMA wire 21 extends along the line of the side walls 8. Thus the SMA wire 21 extends perpendicular to a notional line radial of the optical axis O.

In addition, the crimping members 22 provide electrical connections to the piece of SMA wire 21, allowing a drive current to be supplied through the piece of SMA wire 21. The crimping members 22 are electrically connected to the circuit on the base 4, for example by being soldered to appropriate pads provided thereon. This allows the routing of electrical connections for the SMA actuators 20 across the base to the contacts 7 for connection to a control circuit described further below.

Figure 7:
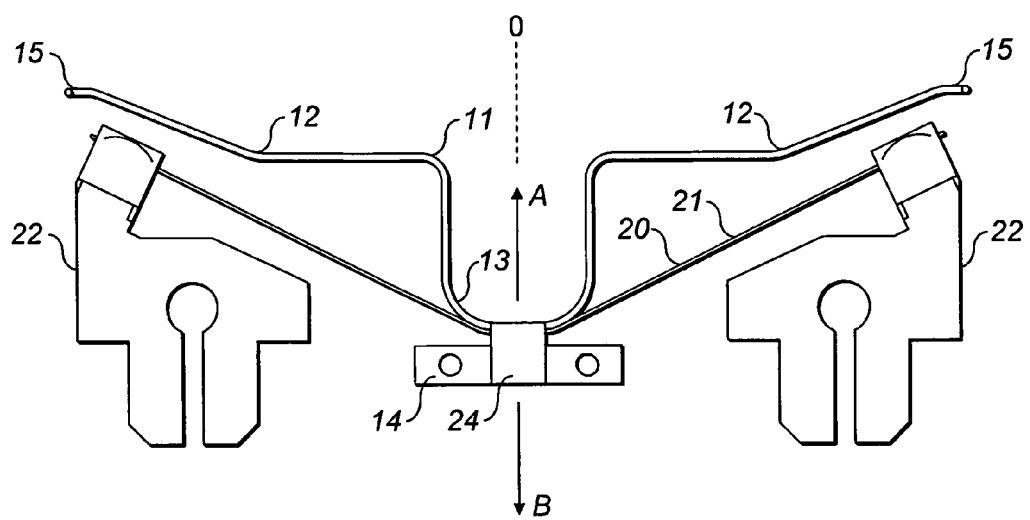
FIG. 7 is a side view of a flexure element and an SMA actuator.

In particular, each piece of SMA wire 21 is arranged adjacent one of the flexure elements 11 with the piece of SMA wire 21 being hooked over the intermediate portion 13. The particular arrangement of the SMA actuator 20 and the flexure element 11 is shown in detail in FIG. 7. Thus, each piece of SMA wire 21 extends between the camera unit 100 and the support structure 2 at an acute non-zero angle to the optical axis O. During the assembly of the camera apparatus, the SMA actuators 20 are first mounted to the chassis 3 and the SMA wires 21 are then jigged or positioned so that they appropriately get hooked onto the intermediate portion 13 of a flexure element 11.

In this configuration of the SMA actuator 20, the piece of SMA wire 21 is held in tension by the flexure element 11, thereby applying a component of force in a direction A along the optical axis O. This deflects the flexure elements 11 which thereby provide a biassing force reacting against the SMA actuator 20 in an opposite direction B along the optical axis O. In this first arrangement of the camera apparatus 1, the flexure elements 11 provide the sole biassing force reacting against the SMA actuators 20.

Thus, in the assembled camera apparatus 1, the flexure element 11 applies a pre-load to the SMA actuator 20. This pre-load is limited by an end-stop 23 formed on the side wall 8 of the chassis 3 that contacts a protrusion 24 that forms part of the intermediate portion 13 of the flexure element 11, thereby limiting movement in the direction B.

Once the SMA actuators 20 and the suspension system 10 have been assembled as shown in FIG. 1, the camera apparatus 1 is ready for assembly of the camera unit 100. To achieve this, the camera unit 100 is jigged into place within the camera apparatus 1 and then fixed to the mounting plates 40 of each of the flexure elements 11. This may be achieved by applying adhesive through and on top of holes formed in the mounting plates 14 to form bonds to the camera unit 100. To achieve this, the chassis 3 may be provided with apertures 25 through which the adhesive is applied, the apertures 25 being subsequently covered by a cover 26 which may be for example a polyamide film bonded in place to protect the mechanism.

The base 4 of the support structure 2 also mounts a gyroscope sensor 71 that outputs a signal representative of the angular velocity of the support structure, thereby acting as a vibration sensor that detects the vibrations that the camera apparatus 1 is experiencing. The gyroscope sensor 71 is typically a pair of miniature gyroscopes, for detecting vibration around two axes perpendicular to each other and the optical axis, although in general larger numbers of gyroscopes or other types of vibration sensor could be used. A control circuit is supplied with the output signals from the gyroscope sensor 71 and generates the drive signals on the basis thereof, as described in more detail below.

Second Arrangement

Figure 8:
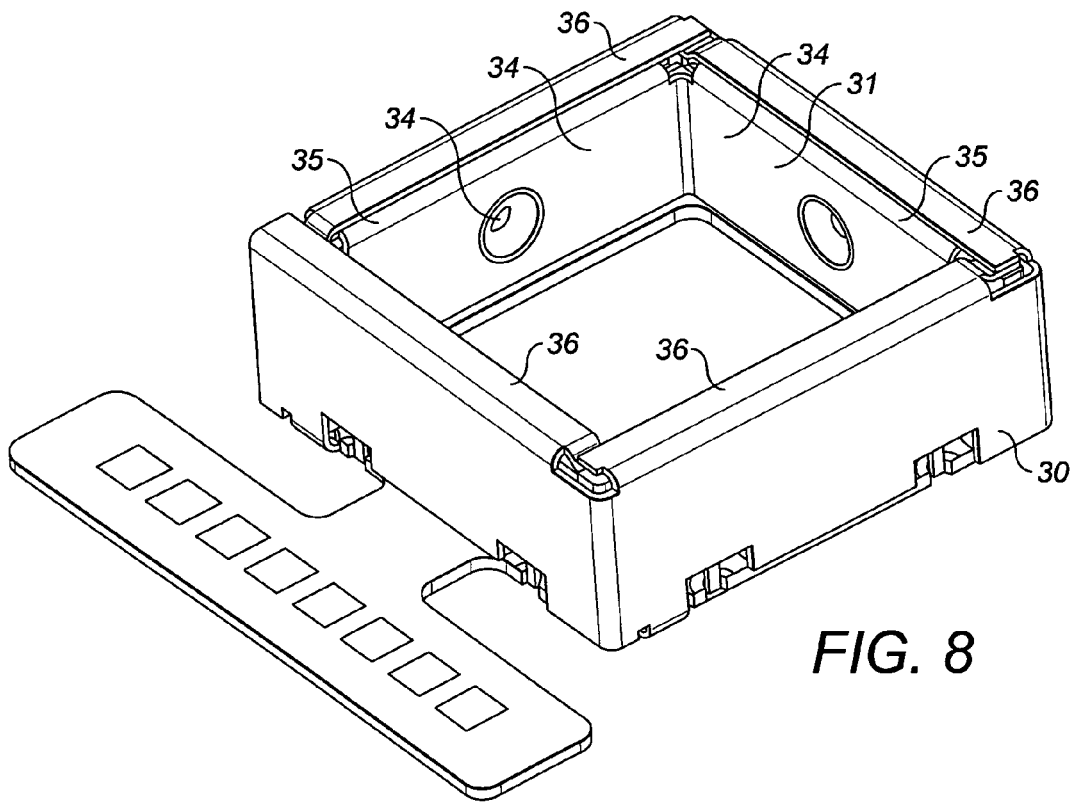
FIG. 8 is a perspective view of a second arrangement of the camera apparatus.
Figure 9:
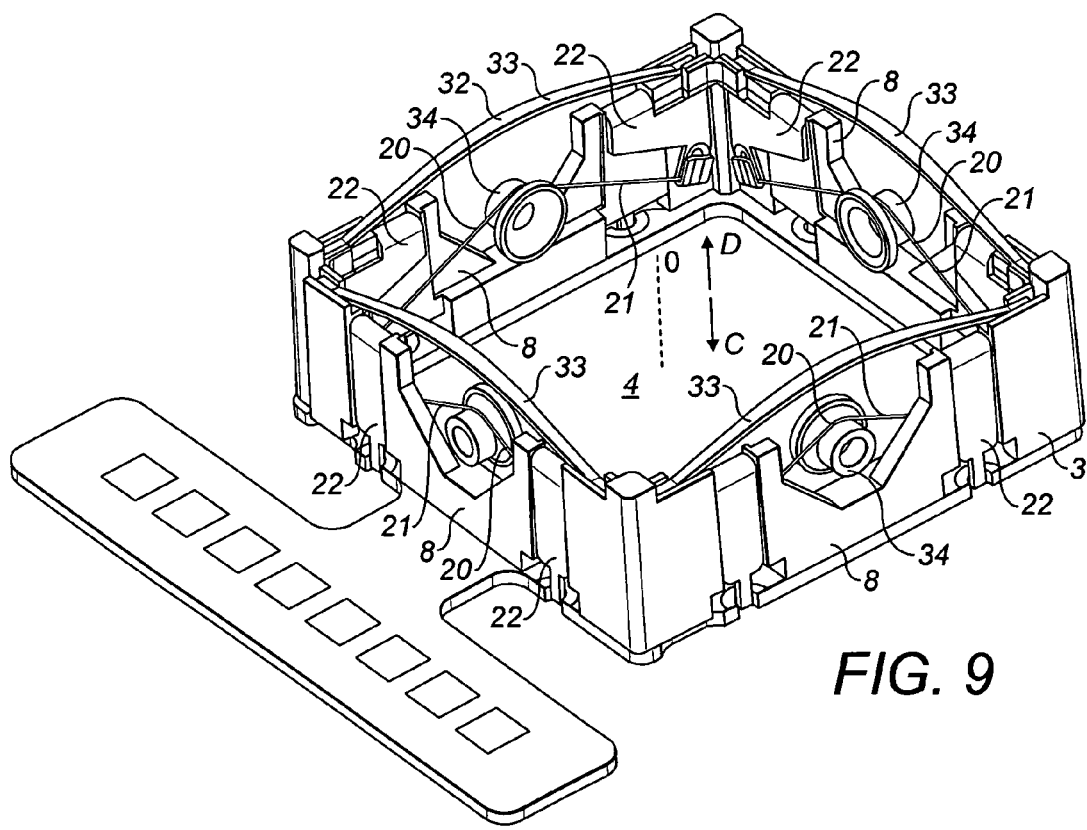
FIG. 9 is a perspective view of a second arrangement of the camera apparatus with the housing omitted.

A second arrangement of the camera apparatus 1 is shown in FIGS. 8 and 9, the camera unit 100 being omitted in both of FIGS. 8 and 9, and the housing 30 and camera mount 31 being omitted in FIG. 9. As with the first arrangement, the second arrangement of the camera apparatus 1 provides OIS for a camera unit 100 having a standard 8.5 mm square footprint.

In the second arrangement, the camera apparatus 1 has a support structure 2 similar to that of the first arrangement, comprising a base 4 that is a PCB and a chassis 3 taking the form of an annular wall having four side walls 8 of identical form.

The chassis 3 supports a suspension system 32 comprising four flexure elements 33 each extending along one side wall 8 of the chassis 3. Each flexure element 33 comprises an arcuate flexure beam connected at its ends to the corners of the chassis 3. In the second arrangement, each flexure beam 33 is a separate element, although they could in principle all be formed from a single piece of material.

The four flexure elements 33 support a camera mount 31 that comprises four walls 34 extending parallel to and inside the side walls 8 of the chassis 3. Each wall 34 has an outwardly extending flange 35 that is connected to the central portion of a respective flexure element 33. The camera unit 100 is connected to the walls 34 of the camera mount 31 and is therefore suspended by the flexure elements 33.

The flexure elements 33 have a greater width as viewed along the optical axis O than thickness as viewed perpendicular to the optical axis O to allow deflection along the optical axis O whilst resisting movement perpendicular to the optical axis O. Thus, the flexure elements 33 support the camera unit 100 on the support structure 2 but allow movement along the optical axis O on deflection of the flexure elements 11. As with the first arrangement, the suspension system 32 also allows tilting of the camera unit 100 around two notional axes that are perpendicular to each other and to the optical axis O upon differential deflection of the flexure elements 33.

The camera apparatus 1 further comprises four SMA actuators 20 each comprising a piece of SMA wire 21 mounted between two crimping members 22 that crimp the piece of SMA wire 21 at each end, as with the first arrangement. The crimping members 22 are each fixed to the chassis 3, located at opposite ends of a respective side wall 8 so that the piece of SMA wire 21 extends along the respective side wall 8, perpendicular to a notional line radial of the optical axis.

The piece of SMA wire 21 of each SMA actuator 20 is hooked over a boss 34 that protrudes outwardly from a respective wall 34 of the camera mount 31. In this configuration of the SMA actuator 20, the piece of SMA wire 21 is held in tension by a respective flexure element 31, thereby applying a component of force in a direction C along the optical axis O.

This deflects the flexure elements 33 which provide a biassing force reacting against the SMA actuator 20 in an opposite direction D along the optical axis O. In the second arrangement of the camera apparatus 1, the flexure elements 33 provide the sole biassing force acting against the SMA actuators 20.

The camera apparatus 1 also includes a housing 30 which protrudes upwardly from the base 4 on the outside of the chassis 3 and including lips 36 that extend inwardly towards the optical axis O to cover the suspension system 32.

Third Arrangement

Figure 10:
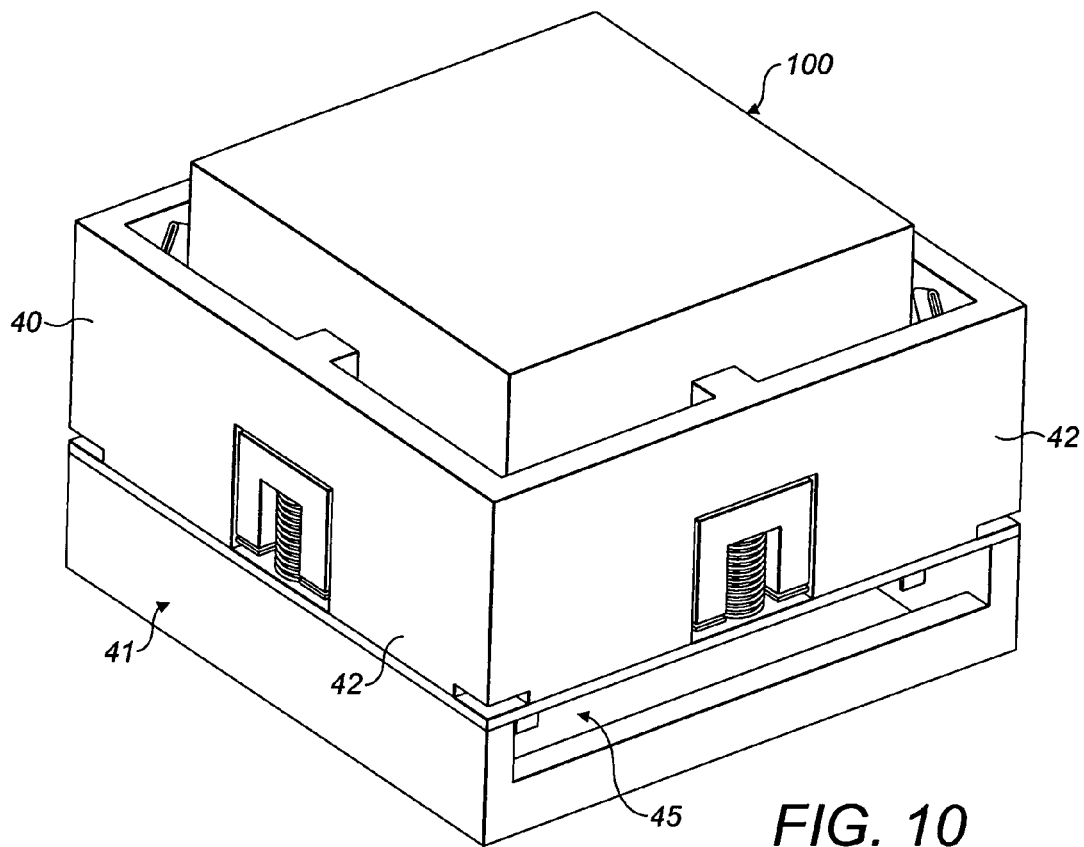
FIG. 10 is a perspective view of a third arrangement of the camera apparatus.

A third arrangement of the camera apparatus 1 is shown in FIG. 10 and is arranged as follows. In the third arrangement, all electrical connections are made to the camera unit 100, not the support structure 2.

Figure 11:
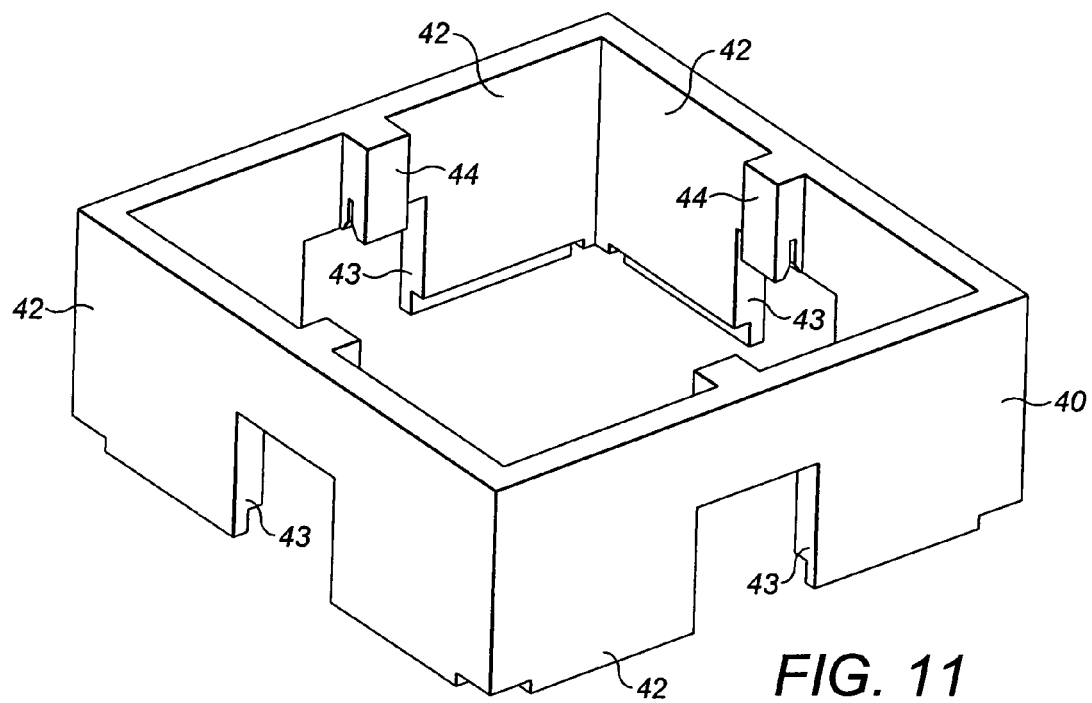
FIG. 11 is a perspective view of the chassis.

The support structure 2 comprises a chassis 40 that is mounted on a base mount 41. The chassis 40 is shown in isolation in FIG. 11 and comprises four side walls 42 of identical form arranged in a loop, each extending along an edge of a square. Each side wall 42 has located in at the centre thereof, a cut-out 43 extending from its lowermost edge (as viewed in FIGS. 10 and 11) and a hook 44 positioned on the inside of the side wall 42 adjacent the cut-out 43.

The base mount 41 spaces the camera unit 100, and any electronics components on its underside from the mechanical ground, as mounted in the product. A slot 45 is provided in the base mount 41 to allow electrical access to the camera unit 100 from wider product system electronics, for example via a flexible printed circuit (FPC) ribbon.

Figure 12:
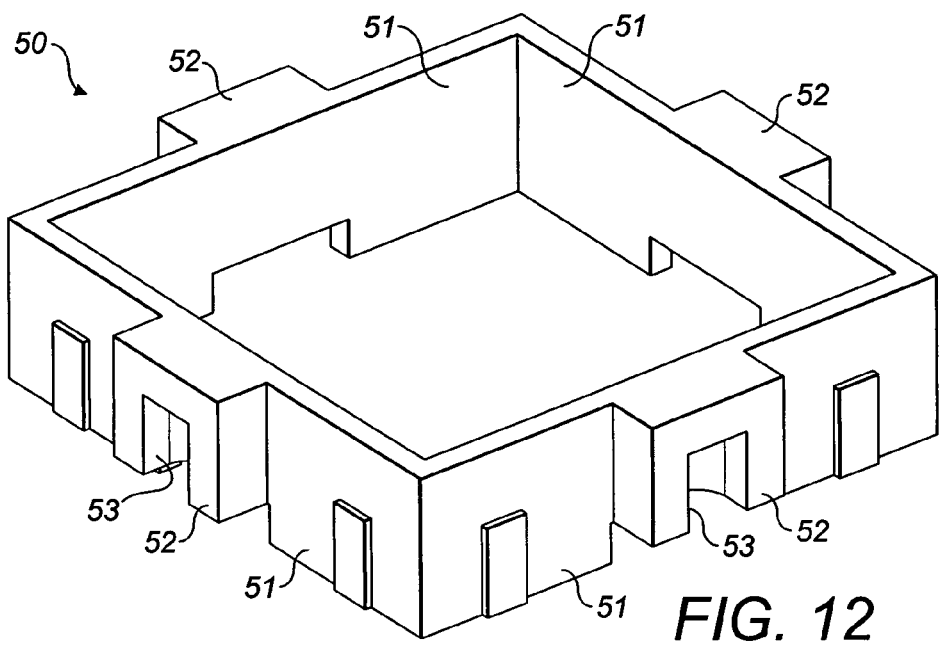
FIG. 12 is a perspective view of the carriage.

The camera apparatus 1 further comprises a carriage 50 for mounting the camera unit 100. The carriage 50 is shown in isolation in FIG. 12 and comprises four side walls 51 of identical form arranged in a loop, each extending along an edge of a square. The camera unit 100 is fixed inside the carriage 50.

Figure 13:
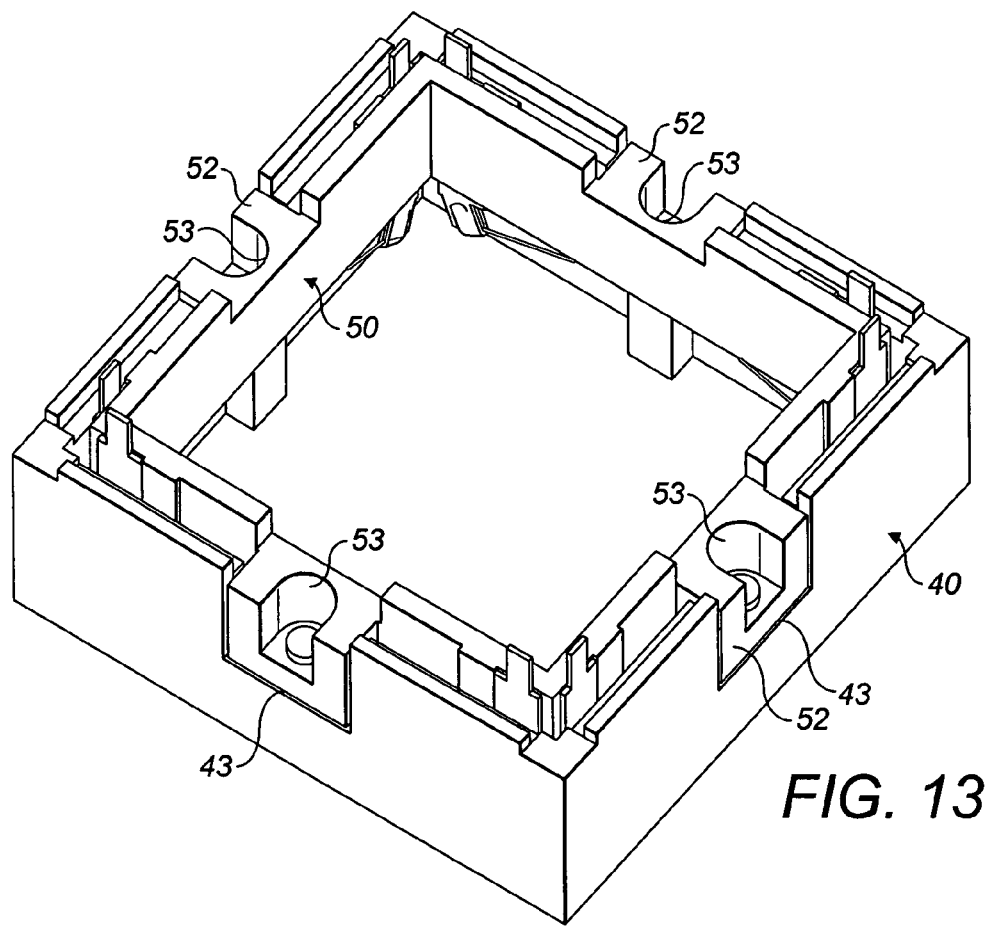
FIG. 13 is a perspective view from below of the carriage and chassis.

As shown in FIG. 13, the carriage 50 is dimensioned to fit inside the chassis 40 in a manner allowing relative movement along the optical axis O. Each side wall 51 has located at the centre thereof, a mounting block 52 protruding outwardly and fitting inside one of the cut-outs 43 of the chassis 40. The end surface 45 of the cut-outs 43 form end-stops that engage the mounting block 52 to limit movement of the camera unit 100 relative to the support structure 2 along the optical axis O. Each mounting block 52 also has a recess 53 opening at the lowermost end (uppermost in FIG. 13).

Figure 14:
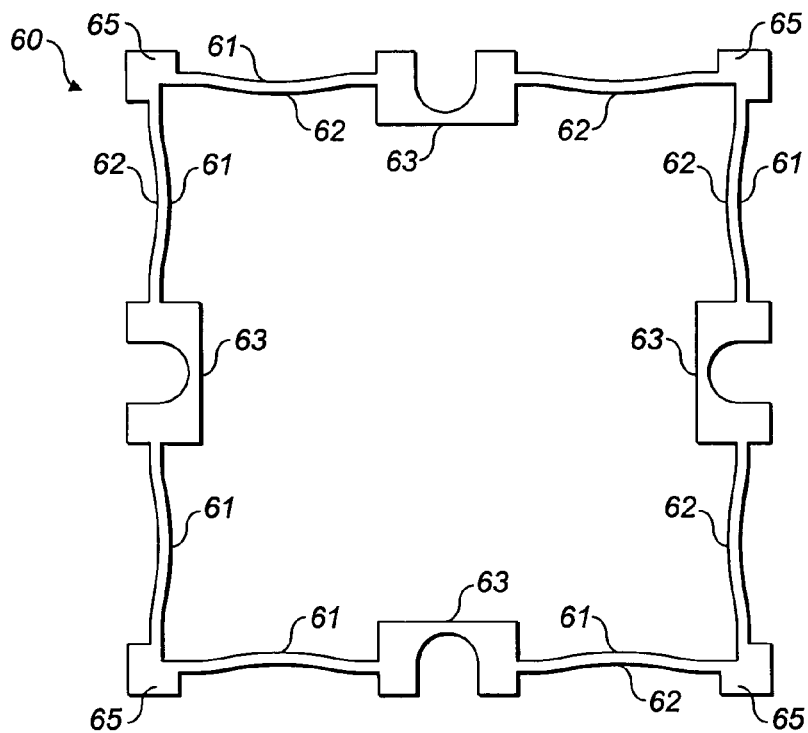
FIG. 14 is a plan view of the suspension system.
Figure 15:
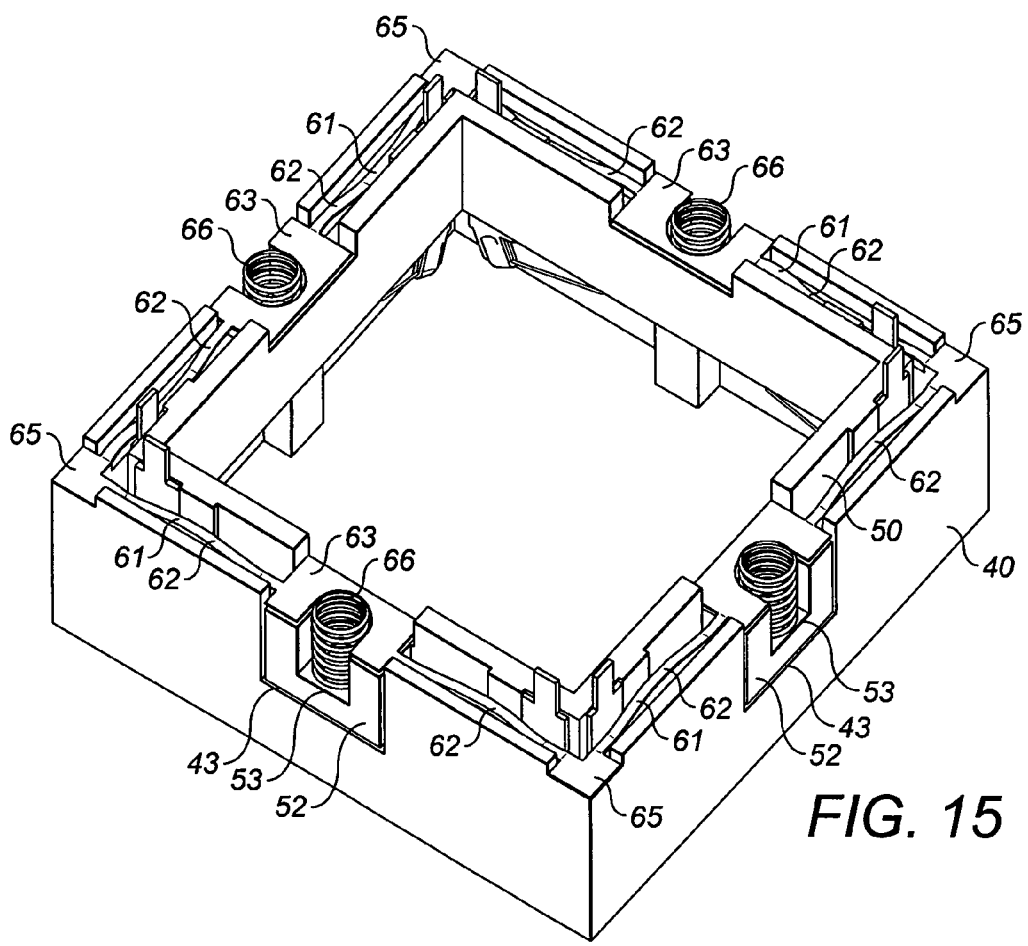
FIG. 15 is a perspective view from below of the carriage and chassis assembled with the suspension system.

The chassis 3 supports a suspension system 60 for the camera unit 100 which is illustrated in isolation in FIG. 14. The suspension system 60 comprises four flexure elements 61 each extending along one side wall 42 of the chassis 40. Each flexure element 61 comprises a pair of flexure beams 62 extending outwardly from an intermediate mount plate 63 to corner mount plates 65. As shown in FIG. 15, the intermediate mount plates 63 are connected to the lower most surface of the mount blocks 52 of the carriage 50, thereby connecting the camera unit 100. The corner mount plates 65 are connected to the corners of the chassis 40. Thus the The entire suspension system 60 consisting of all four flexure elements 61 is formed from a single piece of material, typically a metal, although in principle, each of the flexure elements 61 could equally be formed as a separate element given that the corner portions 65 are connected to the chassis 40.

The flexure beams 62 have a greater width as viewed along the optical axis O than thickness as viewed perpendicular to the optical axis O to allow deflection along the optical axis O while resisting movement perpendicular to the optical axis O.

Thus, via the carriage 50, the flexure elements 61 support the camera unit 100 on the support structure 2, but allowing movement of the camera unit 100 along the optical axis O upon deflection of the flexure elements 61. As there is a flexure element 61 on each of the four sides of the camera unit 100, the suspension system 10 also allows tilting of the camera unit 100 around two notional axes that are perpendicular to each other and to the optical axis O, that is upon differential deflection of the flexure elements 61 arranged opposite one another. Such tilting around two perpendicular axes in general allows tilting of the camera unit 100 about any arbitrary axis perpendicular to the optical axis O.

Figure 16:
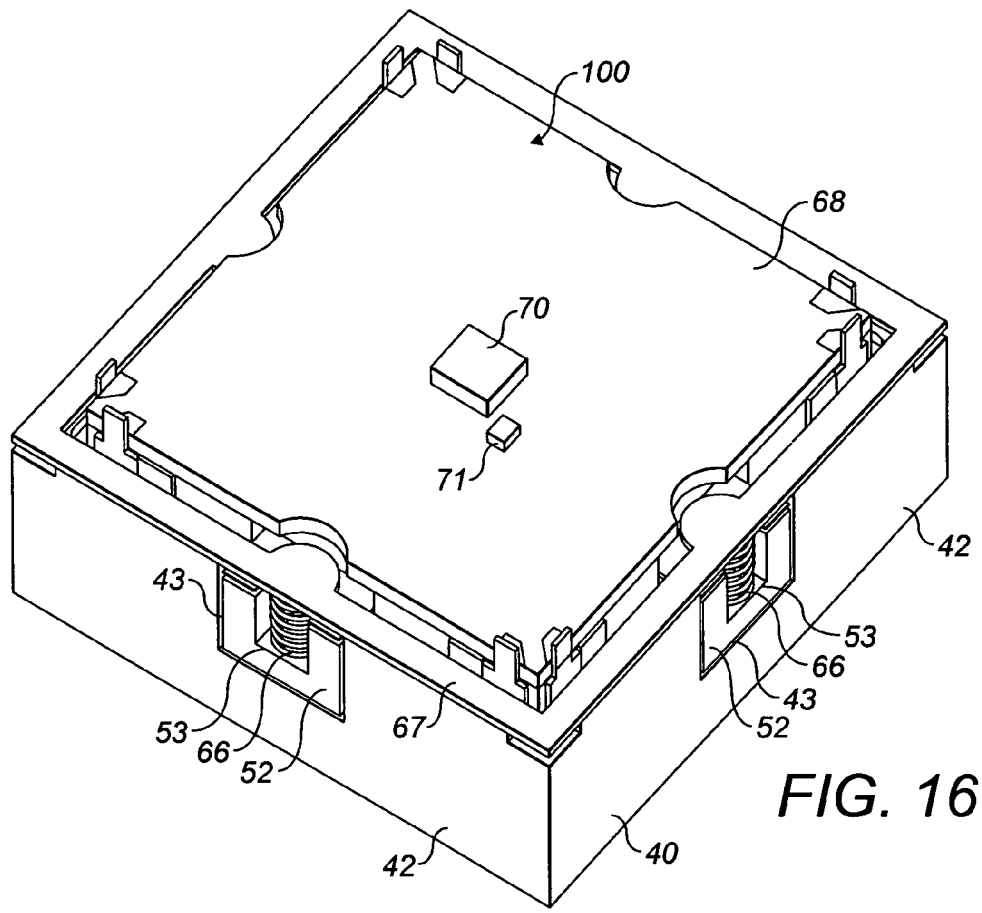
FIG. 16 is a perspective view of view from below of the carriage, chassis and suspension system assembled with the bottom plate.

Deflection of the flexure beams 62 generates a force acting between the support structure 2 and the camera unit 100 along the optical axis O that resists the deflection. In addition, bias springs 66 that are coiled springs are mounted inside the recess 53 of each mount blocks 52. As shown in FIG. 16, the chassis 40 has a base plate 67 which is annular with four sides extending along and fixed to the side walls 42 of the chassis 40. Each bias spring 66 is held in compression between the mount block 52 of the carriage 50 and the base plate 67 of the chassis 40, thereby applying a force acting between the support structure 2 and the camera unit 100 along the optical axis O, in a similar manner to the flexure beams. The bias springs 66, together with the flexure beams 62, thereby apply a pre-load between the support structure 2 and the camera unit 100.

The camera apparatus 1 further comprises four SMA actuators 20 arranged as follows.

Figure 17:
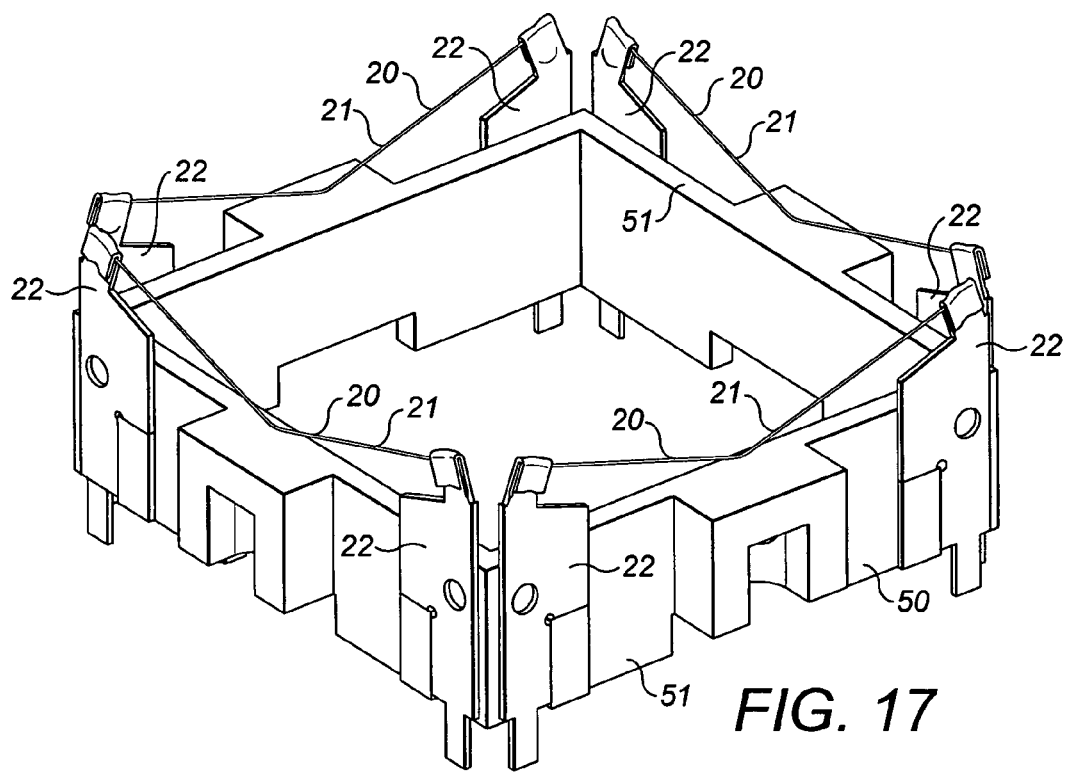
FIG. 17 is a perspective view of the carriage and SMA actuators.

As shown in FIG. 17, each SMA actuator 20 comprises a piece of SMA wire 21 mounted between two crimping members 22 that crimp the piece of SMA wire 21 at each end, thereby providing a mechanical terminal. The crimping members 22 are each fixed to the carriage 50 as shown in FIG. 17 to provide mechanical connection of the SMA actuator 20 to the carriage 50. This mounting may be achieved by a mechanical fitting, strengthened by the use of adhesive. Alternatively this mounting may be achieved by some kind of heat staking process if the carriage 50 is made from polymer material and has suitable heat deformable features to retain the crimping members 22. The crimping members 22 of each SMA actuator 20 are located at opposite ends of a respective side wall 51 of the chassis 50 so that the piece of SMA wire 21 extends along the line of the side walls 50. Thus the SMA wire 21 extends perpendicular to a notional line radial of the optical axis O.

In addition, the crimping members 22 provide electrical connections to the piece of SMA wire 21, allowing a drive current to be supplied through the piece of SMA wire 21. The crimping members 22 are electrically connected to a printed circuit board (PCB) 68 fixed to the lowermost side of the camera unit 100 as shown in FIG. 16, for example by being soldered to appropriate pads provided on the PCB 68.

The PCB 68 mounts an integrated circuit (IC) chip 70 in which is implemented a control circuit for generating drive signals for supply to the SMA actuators 20 via the PCB 68. The PCB 68 also mounts a gyroscope sensor 71 that outputs a signal representative of the angular velocity of the camera unit 100, thereby acting as a vibration sensor that detects the vibrations that the camera unit 100 is experiencing. The gyroscope sensor 71 is typically a pair of miniature gyroscopes, for detecting vibration around two axes perpendicular to each other and the optical axis, although in general larger numbers of gyroscopes or other types of vibration sensor could be used. The control circuit in the IC chip 70 is supplied with the output signals from the gyroscope sensor 71 and generates the drive signals on the basis thereof, as described in more detail below.

The PCB 68 also mounts the image sensor 101 on its upper side, requiring the PCB 68 to have numerous electrical connections to the image sensor 101.

Figure 18:
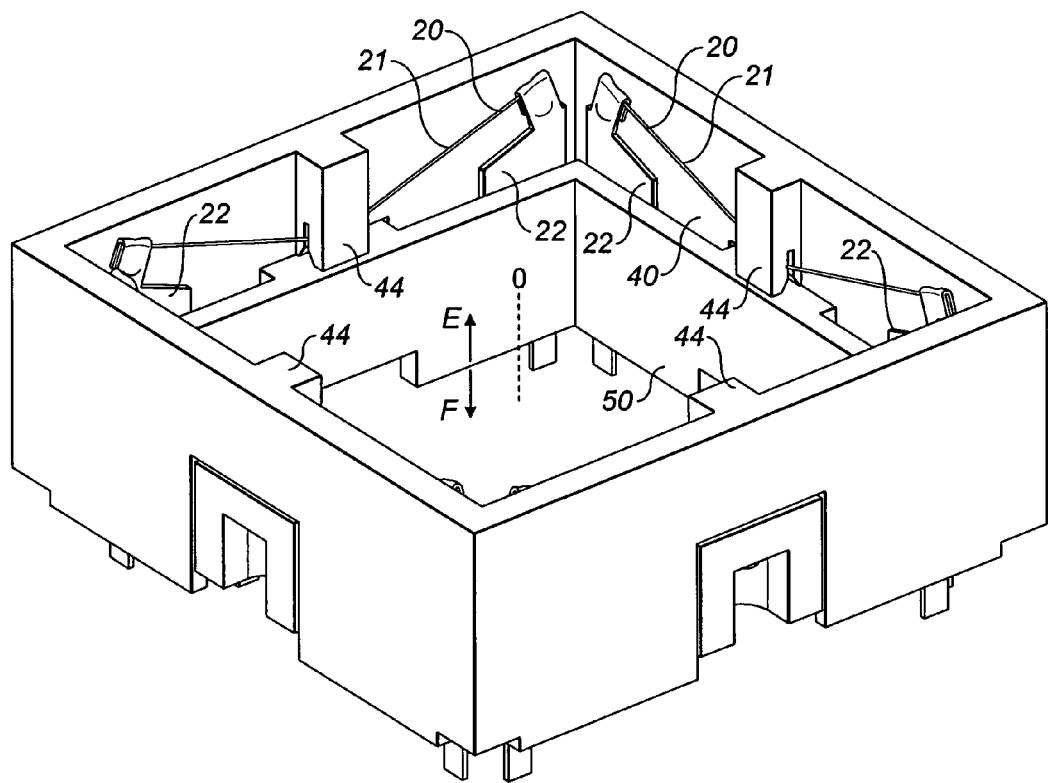
FIG. 18 is a perspective view of the carriage and SMA actuators assembled with the chassis.

As shown in FIG. 18, the piece of SMA wire 21 of each SMA actuator 20 is hooked over a respective hook 44 of the chassis 40. Thus, each piece of SMA wire 21 extends between the camera unit 100 and the support structure 2 at an acute non-zero angle to the optical axis O. In this configuration of the SMA actuator 20, the piece of SMA wire 21 is held in tension by a respective bias spring 66 and flexure element 61, thereby applying a component of force in a direction E along the optical axis O. The bias springs 66 and flexure elements 61 together provide a biassing force reacting against the SMA actuator 20 in an opposite direction F along the optical axis O.

Thus, in the assembled camera apparatus 1, the bias springs 66 and flexure elements 61 together apply a pre-load to the SMA actuator 20. This pre-load is limited by the end-stop formed by the end surfaces 45 of the cut-outs 43 in the chassis contacting the mounting blocks 52 and thereby limiting movement of the camera unit 100 in the direction E. This effectively limits the elongation of the SMA wire 21 when the drive current is reduced or turned off. The pre-load ensures that each SMA wire 21 achieves a certain tension sufficient to overcome the bias force generated by bias springs 66 and flexure elements 61, before the camera unit 100 starts to move. This minimum tension effectively puts a lower limit of on the temperature of the SMA material required for movement, and hence enables the system to operate at high ambient temperatures.

In contrast to the first arrangement in which the biassing force is applied solely by the flexure elements 11, in the third arrangement the bias spring 66 additionally provides a biassing force. This reduces the design constraints on the camera 1 as follows.

Figure 19:
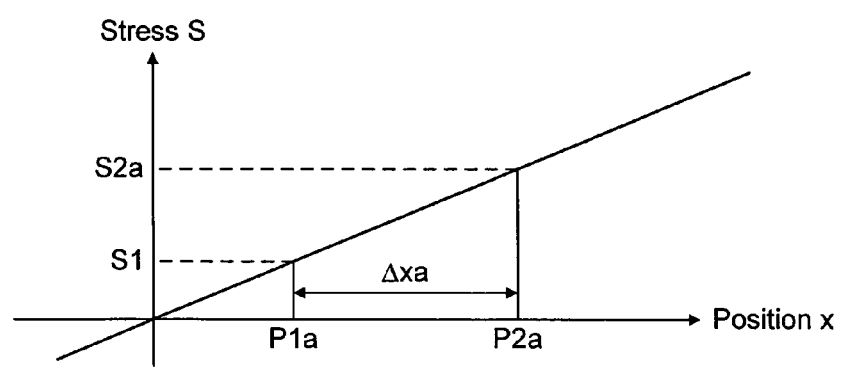
FIG. 19 is a graph of stress developed in the SMA actuator against position in the first arrangement.

By way of comparative example, FIG. 19 is a graph in respect of the first arrangement of the stress S developed (in the suspension system 10 and therefore also the SMA actuator 20) at different positions x of the camera unit 100. The positions P1a and P2a are the ends of the range of movement Δxa of the camera unit 100.

The position P1a of the end-stop 23 is the position of camera unit 100 in its rest state and is selected to pre-stress the suspension system 10 to a stress S1 which is therefore the stress which needs to be developed in the SMA actuator 20 to start movement of the camera unit 100. This pre-stress is designed to be sufficiently high to achieve two effects. Firstly, as the pre-stress raises the temperature at which the stress in the SMA actuator 20 is sufficient to cause contraction against the flexure elements, the pre-stress is selected to having regard to the desired range of ambient temperatures at which the camera apparatus 1 is to operate. Secondly, the pre-stress is selected to hold the camera unit 100 firmly against the end-stop 23 for the purposes of precisely controlling the position and preventing movement of the camera unit 100 caused by external forces.

The position P2a is the position of the camera unit 100 when the SMA actuator 20 is fully contracted and is therefore dependent on the configuration of the SMA actuator 20. At this position P2a, a stress S2 is developed. The position P2a is selected so that at this position P2a, the material limits of the flexure elements 11 are not exceeded.

Figure 20:
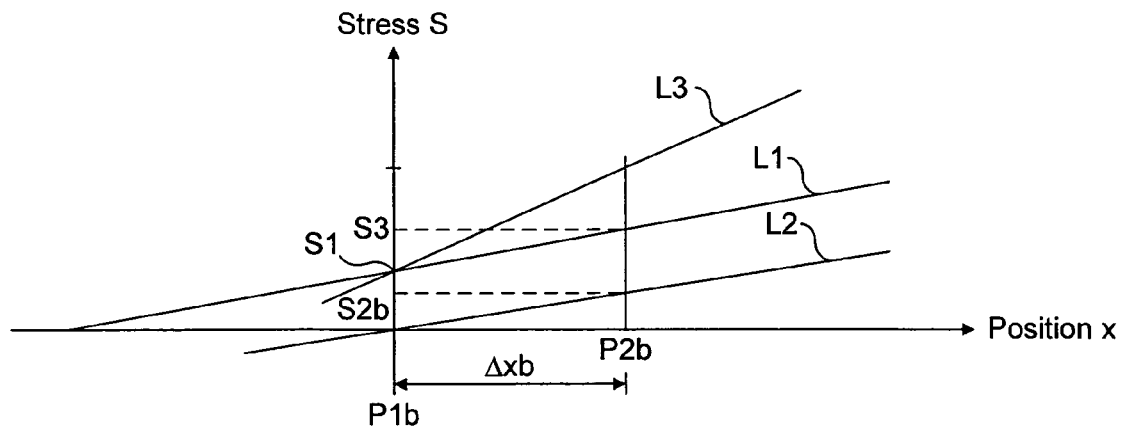
FIG. 20 is a graph of stress developed in the SMA actuator against position in the second arrangement.

FIG. 20 shows an equivalent graph of the stress S developed at different positions x of the camera unit 100 in the third arrangement. In particular line L1 is the stress developed in the bias spring 61, line L2 is the stress developed in the suspension system 60, and line L3 is the total stress developed in the bias spring 61 and the suspension system 60 together which is therefore the stress developed in the SMA actuator 20. The positions P1b and P2b are the ends of the range of movement Δxb of the camera unit 100.

In this example, the position P1b of the end surfaces 45 of the recesses 43 are selected so that in the rest position of the camera unit 100, the suspension system 60 is not deflected and therefore develops no stress, but the bias spring 61 develops the stress S1, having the same value as at the rest position in FIG. 19. This stress S1 is therefore also the stress which needs to be developed in the SMA actuator 20 to start movement of the camera unit 100 and is selected on the basis described above.

The position P2b is the position of the camera unit 100 when the SMA actuator 20 is fully contracted and is therefore dependent on the configuration of the SMA actuator 20. The SMA actuator 20 is configured so that at this position P2b, the stress S3 developed in the bias spring 61, and the stress S2b developed in the suspension system 10 do not exceed the material limits of the bias spring 61 and the flexure elements 61. Compared to the first arrangement as shown in FIG. 2, the constraints on the design of the flexure elements 60 is greatly reduced. Firstly, it is not necessary for the suspension system 10 to provide all the stiffness necessary to bias the SMA actuators 20, this being provided predominantly by the bias springs 61. Secondly, it is possible to operate the flexure elements 60 at lower degrees of deflection. Thus, in the specific example of FIG. 20, the range of movement Δxb is higher than the range of movement Δxa in the comparative example of FIG. 19, whilst providing a lower stress S2b in the suspension system 9 than the stress S2a in the comparative example of FIG. 19.

Operation

The operation of the camera apparatus 1 to provide OIS will now be described.

SMA material has the property that on heating it undergoes a solid-state phase change which causes the SMA material to contract. At low temperatures the SMA material enters the Martensite phase. At high temperatures the SMA enters the Austenite phase which induces a deformation causing the SMA material to contract. The phase change occurs over a range of temperature due to the statistical spread of transition temperature in the SMA crystal structure. Thus heating of the piece of SMA wire 21 causes it to decrease in length.

On heating of the SMA actuator 20, the stress therein increases and the SMA actuator 20 contracts against the biassing force. This causes movement of the camera unit 100 connected to the flexure element 61 along the optical axis O. A range of movement occurs as the temperature of the SMA actuator 20 increases over the range of temperature in which there occurs the transition of the SMA material from the Martensite phase to the Austenite phase. Conversely, on cooling of the SMA actuator 20 so that the stress therein decreases, the biassing provided by the flexure element 61 causes the SMA actuator 20 to expand moving the camera unit 100 in the opposite direction.

The position of the camera unit 100 relative to the support structure 2 along the optical axis O is controlled by varying the temperature of the SMA actuator 20. This is achieved by passing through the SMA actuator 20 a drive current that provides resistive heating. Heating is provided by the drive current. Cooling is provided by reducing or ceasing the drive current to allow the SMA actuator 20 to cool by conduction to its surroundings.

The degree of displacement achievable along the optical axis O is dependent on the strain developed within the SMA actuator 20 and also on the acute angle of the piece of SMA wire 21 extending between the camera unit 1 and the support structure 2 with respect to the optical axis O. The strain which may be developed in the SMA wire 21 is limited by the physical phenomenon of the phase change. Due to the SMA wire 21 extending at an acute non-zero angle to the optical axis O, the SMA wire 21 changes in orientation when it changes in length. This effectively gears the movement so that the degree of displacement along the optical axis O is higher than the change in length of the SMA wire resolved along the optical axis O.

The SMA wire 21 may be made of any suitable SMA material, for example Nitinol or another Titanium-alloy SMA material. Advantageously, the material composition and pre-treatment of the piece of SMA wire 21 is chosen to provide phase change over a range of temperature that is above the expected ambient temperature during normal operation and as wide as possible to maximise the degree of positional control.

Each SMA actuator 20 therefore drives displacement of the camera unit 100 along the optical axis O relative to the support structure 2. As the SMA actuators 20 are arranged at different positions around the optical axis O, the SMA actuators 20 together are capable of driving tilting of the camera unit, that is on contraction of the SMA actuators 20 to provide differential displacement. Thus, by appropriate control of the SMA actuators 20, the camera unit 100 may be driven to tilt around two notional axes that are perpendicular to each other and to the optical axis O. In particular, differential displacement of each pair of opposing SMA actuators 20 drives displacement around a single notional axis perpendicular to the optical axis O. Hence, the four actuators 20 may be driven to provide tilting about any arbitrary notional axis perpendicular to the optical axis O.

In the camera apparatus 1, four SMA actuators 20 are provided and are spaced evenly around the optical axis O. This simplifies the nature of the control provided, and furthermore the configuration of four SMA actuators 20 is convenient and compact. However, in general the number of SMA actuators 20 may be changed, provided there are at least three SMA actuators 20 to provide tilt around two perpendicular notional axes.

As OIS is achieved by tilting of the camera unit 100 as a whole, this has the advantage that by separating the OIS function from the other camera functions the internal design of the camera unit 100 is unaffected. This is particularly straightforward in the case of a miniature camera unit 100 because of its small size and inertia.

Furthermore, the use of SMA actuators 20 means that the actuation arrangement is vertically compact due to the high energy density of SMA material as compared to other actuation arrangements.

The first arrangement of the camera apparatus 1 also is particularly compact. In particular, it is able to deliver OIS to a camera unit 100 of size 8.5 mm square within a total footprint of only 9.5 mm square, that is adding only 1 mm to the width of the footprint. This may be contrasted with the second arrangement which increases the footprint of the camera unit 100 to 11 mm square. The provision of OIS also has a very small impact on the height of the camera apparatus 1, accepting the need to allow clearance for the tilting movement during OIS. In particular, the height of the first arrangement of the camera apparatus 1 is only 3.8 mm. The small size is achieved through use of SMA material as an actuator, and further by the specific construction in which the piece of SMA wire 21 is hooked over the flexure element 11. This intimate arrangement reduces size by combining three functions within the flexure element namely: (1) provision of a biasing force opposing the SMA actuator 20; (2) provision of a feature over which the piece of SMA wire 21 is hooked; and (3) provision of the feature to which the camera unit 100 is connected, such that the flexure element 11 laterally and vertically locates the camera unit 100 in the camera apparatus 1 as a whole and constrains the camera unit 100 to move with movements of the SMA actuator 20.

The SMA actuators 20 may be driven with a high degree of positional control. As the suspension system 10, 32, 60 allows the camera unit 100 to move along the optical axis O and the SMA actuators 20 arranged to drive displacement along the optical axis O, the tilting is achieved by the SMA actuators 20 driving differential displacement. The relative degrees of displacement desired from each SMA actuator 20 are selected to provide a desired differential displacement. However, each individual SMA actuator 20 can be controlled independently to provide the displacement required from it, for example based on the resistance of that SMA actuator 20 as described further below. This advantage is achievable because the suspension system 10, 32, 60 allows for movement of the camera unit 100 along the optical axis O.

In addition, as the suspension system 10, 32, 60 allows for movement of the camera unit 100 along the optical axis O, there is an additional advantage that in the state of applying no drive current the camera unit is held in a fixed position against the end-stops by the suspension system 10, 32, 60 and/or bias spring 66. Thus, the camera apparatus 1 can still be used without the OIS function, for example in the event of a failure of the control circuit 80 of the SMA actuators 20. This contrasts with the camera apparatus of US-2006/0272328 wherein an absence of power causes the opposed SMA wires to both be slack with the result that the camera unit will be unstably mounted on the support structure.

Furthermore, the suspension system 10, 32, 60 has benefits arising from the use of flexure elements 11, 33, 61 to support the camera unit 100, in particular that the flexure elements 11, 33, 61 may be arranged to provide a low stiffness along the optical axis O and a high stiffness in perpendicular directions. Similarly, the flexure elements 11, 33, 61 experience a minimal degree of friction against movement as compared to other suspension systems, for example a bearing. Also, the suspension system 10, 32, 60 is compact and straightforward to manufacture.

One of the key advantages of SMA material as an actuator technology is its very high energy density (mechanical energy available for a given mass of material). This allows the SMA actuators 20 and associated mechanisms to be extremely small, with the result that only a small increase in size of the camera apparatus 1 is needed to provide OIS. The SMA actuators 20 are also able to deliver high forces. Both these factors make SMA highly suited to providing the actuator for an OIS system for a miniature camera unit 100.

In addition, it has been appreciated that the SMA actuators 20 may be provided with a sufficient speed of response to provide OIS. Typically each SMA actuator 20 is proportionally driven so as to control the position over a frequency bandwidth up to 10 Hz, up to 20 Hz, or up to 30 Hz. A perceived drawback of SMA as an actuator is its slow response time. As an SMA actuator 20 is thermally driven, the response time is limited by the temperature change achievable, being associated with thermal conductivity, specific heat capacity, and thermal mass.

Whilst heating of the SMA wire can be increased by increasing the power of the drive current, cooling is dependent on the thickness of the piece of SMA wire 21. This thickness is selected to provide the desired response time during cooling. For the SMA wire 21 of thickness 25 μm, being currently the thinnest available commercial material, the thermal response begins to roll off at 4 Hz. Based on analysis of the OIS function, the functional requirement is to provide movement compensation over a bandwidth of up to 30 Hz. However, the amplitude of response required drops markedly over the operating bandwidth, so as to only require less movement (say less than 10 μm at over 20 Hz).

Surprisingly, in spite of the roll-off in SMA wire response above 4 Hz, the SMA wire 21 is still able to deliver the displacement requirements at 30 Hz, and so the SMA actuators 20 are able to successfully meet the actuation requirements of the OIS for miniature cameras.

Figure 21:
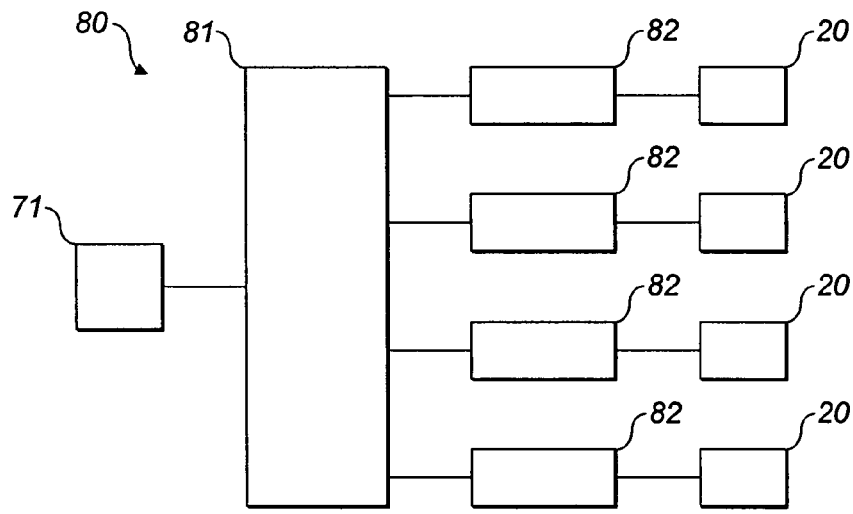
FIG. 21 is a diagram of a control circuit for generating drive signals for the SMA actuators.

The control circuit 80 for generating the drive signals for the SMA actuators 20 is shown in FIG. 21 and will now be described.

The control circuit 80 comprises an SMA controller 81 that is supplied with the output signal of gyroscope sensor 71 and in response thereto generates a control signal in respect of each SMA actuator 20. The SMA controller 81 may be implemented in a processor and generates the control signals in accordance with a control algorithm. The control signals are representative of the degree of actuation required from the respective SMA actuators 20 to compensate for the vibration represented by the output signal of gyroscope sensor 71. Thus the control signals for a pair of opposing SMA actuators 20 are generated to provide a differential displacement providing the required degree of tilt around the corresponding notional axis perpendicular to the optical axis O. Effectively this means that the difference the control signals is representative of the demanded angle of tilt around that axis.

Ideally, the gyroscope sensor 71 is aligned to provide two output signals representative of the tilt around perpendicular axes aligned with the axes around which each pair of opposed SMA actuators 20 is capable of tilting the camera unit 100. In this case, the control signals for each pair of opposed SMA actuators 20 is derived from a single one of the output signals. However, in the case of misalignment, or a gyroscope sensor 71 that provides more output signals, the control signals for each pair of opposed SMA actuators 20 is derived from a linear combination of the output signals.

The control algorithm implemented in the SMA controller 81 varies as between the first and third arrangements, due to the different location of the gyroscope sensor 71. In the first arrangement, as the gyroscope sensor 71 is fixed to the support structure 2, so the output signals are representative of the vibration of the support structure 2. Such vibration will always be present and OIS is effected by tilting the camera unit 100 in opposition. Accordingly, the SMA controller 81 generates control signals providing a demanded angle of tilt which is opposite to the actual tilt as measured by the gyroscope sensor 71. In the third arrangement, as the gyroscope sensor 71 is fixed to the camera unit 100, so the output signals are representative of the vibration of the camera unit 100. OIS is effected by tilting the camera unit 100 in a manner tending to reduce these vibrations. Accordingly, the SMA controller 81 generates control signals providing a demanded angle of tilt reduces the actual tilt as measured by the gyroscope sensor 71. In practical terms, this means that it is easier to provide more accurate compensation with the third arrangement by applying proportional control of the SMA actuators 20 in the drive circuits 82 with a high gain between the output of the gyroscope sensor 20 and the SMA actuators 20.

Figure 22:
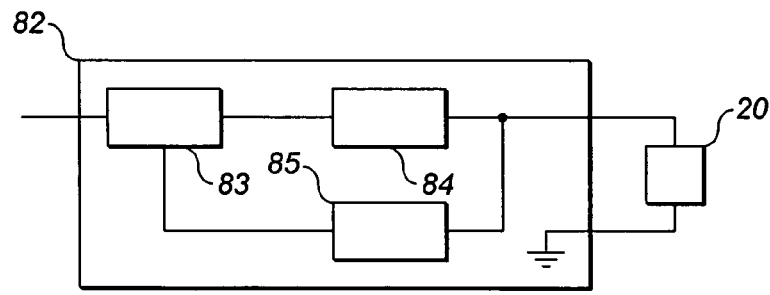
FIG. 22 is a diagram of the drive circuit of the control circuit.

The control signal for each SMA actuator 20 is supplied to a respective drive circuit 82 that generates a drive signal in accordance therewith and supplies the drive signal to the SMA actuator 20. The drive circuits 82 have identical arrangement as shown in FIG. 22.

The drive circuit 82 includes a drive controller 83 that is supplied with the control signal from the SMA controller 81 and controls a driver 84 using resistance feedback. The drive controller 83 may be implemented in a processor. Although the SMA controller 81 and the drive controllers 83 are illustrated as separate components of ease understanding, they may be implemented in a common processor.

The driver 84 is connected to supply the drive current to the SMA actuator 20. The driver 84 may be a constant-voltage current source or a constant-current current source. For example, in the latter case the constant current might be of the order of 120 mA.

The drive circuit 82 further includes a detection circuit 85 arranged to detect the resistance of the SMA actuator 20. In the case that the driver 84 is a constant-current current source, the detection circuit 85 may be a voltage detection circuit operable to detect the voltage across the SMA actuator 20 which is a measure of the resistance of the piece of SMA wire 21. In the case that the driver 84 is a constant-voltage current source, the detection circuit 85 may be a current detection circuit. For a higher degree of accuracy the detection circuit 85 may comprise a voltage detection circuit and a current detection circuit operable to detect both the voltage and current across the SMA actuator and to derive a measure of resistance as the ratio thereof.

The drive controller 82 is arranged to control the driver 84 to supply a pulse-width modulated current. The drive controller 82 receives the resistance measured by the detection circuit 54 and uses it as a feedback signal in a closed-loop control algorithm to control the PWM duty cycle of the driver 84 to actuate the SMA actuator 20 in accordance with the demand represented by the control signal supplied to the drive circuit 20. The closed-loop control may be proportional.

By using the electrical resistance of the SMA actuator 20 as a feedback parameter that relates to position, as over the functional movement range, the contraction and expansion of the SMA material is approximately linear with its electrical resistance. Non-linearities, including hysteresis and creep, occur to some extent. These may be ignored, but for better linearity, these may be accounted for in the closed-loop control algorithm.

Although this drive circuit 85 and its algorithm is very successful in controlling the SMA actuator 20, owing to the natural variation in SMA material properties from batch to batch, and other manufacturing tolerances, such as spring stiffnesses and assembly placement tolerances, the actual change in tilt of the camera unit 100 that corresponds to a certain change in the demanded tilt will have some variance, perhaps only being accurate to approximately 10%.

This variance can be reduced in a number of ways.

In the case of the first arrangement, one convenient approach is to encapsulate the accuracy error of the SMA actuators 20 is to consider it as an error in the SMA drive control gain, for example the gain between the displacement of each SMA actuator 20 and its electrical resistance. The change in position that corresponds to a specific (quasi-linear) change in resistance corresponds to the gain, and hence all the errors can be considered as an error in this gain. This gain may be calibrated for individual camera apparatuses 1 during manufacture on the basis of measurements of the displacement of the actuators 20.

Another approach is to dispose the gyroscope sensor 71, or other vibration sensor, on the camera unit 100, so that they sense the actual vibration of the camera unit 100. This provides a number of advantages.

Firstly, the aim of the OIS control algorithm becomes minimising the vibrations detected by the gyroscope sensor 71, rather than delivering an opposing correction to the detected tilt. The output signals of the gyroscope sensor 71 senses the actual vibrations irrespective of whether the camera vibrations are due to a base excitation of the system, such as user handshake, or due to errors in the accuracy of the SMA control gain. Thus, it becomes possible to optimise the SMA actuator gain to minimise the tilt sensed by the gyroscope sensors. In particular, the control circuit 80 has an adjustable gain and is arranged to adjust its gain to minimise the sensed vibrations. The overall gain may be adjusted by adjustment of the gain of the SMA controller 81 and/or the drive controller 83

Secondly, the gyroscope sensor 71 can be mounted on the same PCB 68 as used to mount the image sensor 101, which is convenient for electrical connections, and also provides a convenient place to mount the control circuit 80.

An alternative scheme applicable to the first or third arrangement is to use a dedicated calibration routine in which the control circuit 80 demands a deliberate vibration from the SMA actuators 20, and the induced vibrations are then sensed by the gyroscope sensor 71, and so the actual tilt vibrations can be assessed. Based on the output signals of the gyroscope sensor 71, the gain is adjusted until the demanded tilts match the measured tilts. This scheme assumes the base excitation vibrations can be ignored or deconvolved from the sensed vibrations.

As there are a plurality of separate SMA actuators 20, each one can have a variable gain that can be separately optimised as part of the algorithm described above.

A particular aspect of the third arrangement is that the crimping members 22 of the SMA actuators 20 are connected to the camera unit 100, not the support structure as in the first and second arrangements. In effect, this inverts the way the SMA actuators 20 are mounted. There are two main advantages to this approach.

The first advantage is that integration of the camera unit 100 with the SMA actuators is simple, because the camera unit 100 is a substantial solid component.

The second advantage is associated with the electronics of the wider OIS system. As the SMA actuators 20 are fixed to the camera unit 100, the electrical connections for both the SMA actuators 20 and the image sensor 101 may be made in the camera unit 100, in particular from the PCB 68. This simplifies the electronics by making both electrical connections in the same component. In practical terms, it also reduces the overall system volume.

An associated point relates to the gyroscope sensor 71, which in the third arrangement is also mounted on the camera unit 100. In general provision of OIS requires a vibration sensor, such as the gyroscope sensor 71, to monitor the vibrations of the camera. The control circuit uses the output signals of the vibration sensor in a control algorithm, typically implemented in a processor, to generate control signals representative of the actuation of the SMA actuators 20 required to suppress the vibrations and maintain the orientation of the camera unit 100. The control circuit also includes a drive circuit including electronic components to generate drive signals for the SMA actuators 20 in accordance with the control signals. As the SMA actuators 20 are fixed to the camera unit 100, it is possible for the entire control circuit and all its connections to be provided in the camera unit 100. Furthermore, provision of the gyroscope sensor 71, or in general any vibration sensor, on the camera unit 100, provides advantages in operation of the control algorithm implemented in the control circuit, as described above.

In this way, the support structure 2 requires no electrical connections, and all connection are simply routed to the camera unit 100, which would require electrical connections for the image sensor 101 in any case.

The invention claimed is:

1. A camera apparatus comprising:
   a support structure;
   a camera unit comprising an image sensor and a lens system for focussing an image on the image sensor;
   a suspension system comprising a plurality of flexure elements supporting the camera unit on the support structure in a manner allowing the camera unit to tilt around two notional axes that are perpendicular to each other and to the optical axis of the lens system on deflection of the flexure elements; and
   a plurality of SMA actuator wires each connected between the camera unit and the support structure and arranged on contraction to drive tilting of the camera unit.

2. A camera apparatus according to claim 1, wherein the SMA actuator wires each comprise a piece of SMA wire fixed at both ends to one of the camera unit and the support structure and intermediate its ends hooked over a portion of a respective flexure element that is connected to the other one of the camera unit and the support structure, the SMA actuator wires being arranged on contraction to drive tilting of the camera unit, the resultant deflection of the flexure elements providing a biassing force reacting against the SMA actuator wire.

3. An apparatus according to claim 1, wherein said resultant deflection of the flexure elements provides the sole biassing force reacting against the SMA actuator wire.

4. An apparatus according to claim 2, wherein said one of the camera unit and the support structure is the support structure and said other one of the camera unit and the support structure is the camera unit.

5. A camera apparatus according to claim 1, further comprising a biassing element, separate from the suspension system, that provides a biassing force reacting against the SMA actuator wire on contraction of the SMA actuator wire.

6. An apparatus according to claim 5, wherein the SMA actuator wires are arranged at different positions spaced evenly around the optical axis.

7. An apparatus according to claim 6 comprising four SMA actuator wires.

8. An apparatus according to claim 2, wherein the flexure elements each comprise a pair of flexure beams extending from an intermediate portion that is connected to said other one of the camera unit and the support structure to portions that are connected to said one of the camera unit and the support structure, the pieces of SMA wire being hooked over the intermediate portion.

9. An apparatus according to claim 8, wherein the intermediate portion protrudes away from the flexure beams along the optical axis.

10. An apparatus according to claim 8, wherein the flexure elements are formed integrally.

11. An apparatus according to claim 8, wherein the flexure elements are each a shaped sheet of material.

12. An apparatus according to claim 2, wherein each piece of SMA wire extends between the one of the camera unit and the support structure and portion of a respective flexure element that is connected to the other one of the camera unit and the support structure perpendicular to a notional line radial of the optical axis.

13. An apparatus according to claim 12, wherein the piece of SMA wire extends at a non-zero angle to the optical axis.

14. An apparatus according to claim 2, further comprising a biassing element, separate from the suspension system, that provides a biassing force reacting against the SMA actuator wire on contraction of the SMA actuator wire.

* * * * *